US012043480B1

(12) United States Patent
Yang et al.

(10) Patent No.: US 12,043,480 B1
(45) Date of Patent: Jul. 23, 2024

(54) TRASH CAN ASSEMBLY

(71) Applicant: simplehuman, LLC, Torrance, CA (US)

(72) Inventors: Frank Yang, Rancho Palos Verdes, CA (US); David Wolbert, Redondo Beach, CA (US); Joseph Sandor, Newport Beach, CA (US); Kenneth Yen, Torrance, CA (US); Orlando Cardenas, Laguna Niguel, CA (US); Michael Basha, Brisbane, CA (US); Christopher Fruhauf, San Anselmo, CA (US)

(73) Assignee: simplehuman, LLC, Torrance, CA (US)

( * ) Notice: Subject to any disclaimer, the term of this patent is extended or adjusted under 35 U.S.C. 154(b) by 0 days.

(21) Appl. No.: 18/602,917

(22) Filed: Mar. 12, 2024

Related U.S. Application Data

(63) Continuation of application No. 18/182,284, filed on Mar. 10, 2023, which is a continuation of application
(Continued)

(51) Int. Cl.
*B65F 1/16* (2006.01)
*B65F 1/04* (2006.01)
*B65F 1/06* (2006.01)

(52) U.S. Cl.
CPC .............. *B65F 1/1638* (2013.01); *B65F 1/04* (2013.01); *B65F 1/06* (2013.01); *B65F 1/068* (2013.01); *B65F 1/1646* (2013.01)

(58) Field of Classification Search
CPC .. B65F 1/1638; B65F 1/04; B65F 1/06; B65F 1/068; B65F 1/1646
(Continued)

(56) References Cited

U.S. PATENT DOCUMENTS

| | | | |
|---|---|---|---|
| 830,182 | A | 9/1906 | Skov |
| 1,379,677 | A | 5/1921 | Edward |

(Continued)

FOREIGN PATENT DOCUMENTS

| | | |
|---|---|---|
| AU | 622536 | 4/1992 |
| BR | 202013004348 U2 | 11/2014 |

(Continued)

OTHER PUBLICATIONS

Simplehuman Liner Rim Dual Bucket Rectangular Recycler with Liner Pocket, Stainless Steel, 58 Liter / 15 Gallon, Item No. CW2025, www.Amazon.com, site visited Dec. 29, 2015.

(Continued)

*Primary Examiner* — David Luo
(74) *Attorney, Agent, or Firm* — Knobbe, Martens, Olson & Bear, LLP

(57) ABSTRACT

Various embodiments of a trash can assembly (e.g., a receptacle configured to receive refuse, recyclable materials, or otherwise), and related methods, are provided. Some embodiments of the trash can assembly include a body component and a lid configured to move between an open position and a closed position. In some variants, the lid can be moved between the open and closed positions by a power operated driving mechanism, such as a motor and/or other drivetrain components. In certain embodiments, the trash can assembly includes a clutch mechanism to facilitate manual operation of the lid while inhibiting or preventing damage to the motor and/or other drivetrain components.

13 Claims, 13 Drawing Sheets

Related U.S. Application Data

No. 17/449,408, filed on Sep. 29, 2021, now Pat. No. 11,603,263, which is a continuation of application No. 16/901,376, filed on Jun. 15, 2020, now Pat. No. 11,136,186, which is a continuation of application No. 15/783,370, filed on Oct. 13, 2017, now Pat. No. 10,683,165, which is a continuation of application No. 13/787,638, filed on Mar. 6, 2013, now Pat. No. 9,790,025.

(60) Provisional application No. 61/609,233, filed on Mar. 9, 2012.

(58) Field of Classification Search
USPC ............... 220/495.08, 495.06, 495.01; 318/3
See application file for complete search history.

(56) References Cited

U.S. PATENT DOCUMENTS

| | | | |
|---|---|---|---|
| 1,426,211 | A | 8/1922 | Pausin |
| 1,461,253 | A | 7/1923 | Owen |
| 1,754,802 | A | 4/1930 | Raster |
| 1,820,555 | A | 8/1931 | Buschman |
| 1,891,651 | A | 12/1932 | Padelford et al. |
| 1,922,729 | A | 8/1933 | Geibel |
| 1,980,938 | A | 11/1934 | Geibel |
| 2,046,777 | A | 7/1936 | Geibel |
| 2,308,326 | A | 1/1943 | Ambrose |
| D148,825 | S | 2/1948 | Snider |
| 2,457,274 | A | 12/1948 | Rifken |
| 2,591,104 | A | 4/1952 | Stone |
| 2,593,455 | A | 4/1952 | James |
| 2,699,368 | A | 1/1955 | Alois |
| 2,759,625 | A | 8/1956 | Ritter |
| 2,796,309 | A | 6/1957 | Taylor |
| 2,888,307 | A | 5/1959 | Graves et al. |
| 2,946,474 | A | 7/1960 | Knapp |
| 3,008,604 | A | 11/1961 | Garner |
| 3,023,922 | A | 3/1962 | Arrington et al. |
| 3,137,408 | A | 6/1964 | Taylor |
| 3,180,384 | A | 4/1965 | Seifert |
| 3,261,545 | A | 7/1966 | Frazier |
| 3,300,082 | A | 1/1967 | Patterson |
| 3,392,825 | A | 7/1968 | Gale et al. |
| 3,450,297 | A | 6/1969 | Clerk |
| 3,451,453 | A | 6/1969 | Heck |
| 3,618,814 | A | 11/1971 | Nagroski |
| 3,654,534 | A | 4/1972 | Fischer |
| 3,800,503 | A | 4/1974 | Maki |
| 3,820,200 | A | 6/1974 | Myers |
| 3,825,150 | A | 7/1974 | Taylor |
| 3,825,215 | A | 7/1974 | Borglum |
| 3,870,261 | A | 3/1975 | McSwain |
| 3,886,425 | A | 5/1975 | Weiss |
| 3,888,406 | A | 6/1975 | Nippes |
| 3,891,115 | A | 6/1975 | Ono |
| 3,893,615 | A | 7/1975 | Johnson |
| 3,964,630 | A | 6/1976 | Getz |
| 4,014,457 | A | 3/1977 | Hodge |
| 4,027,774 | A | 6/1977 | Cote |
| 4,081,105 | A | 3/1978 | Dagonnet et al. |
| 4,189,808 | A | 2/1980 | Brown |
| 4,200,197 | A | 4/1980 | Meyer et al. |
| 4,217,616 | A | 8/1980 | Jessup |
| 4,223,858 | A | 9/1980 | De Salazar |
| 4,303,174 | A | 12/1981 | Anderson |
| 4,320,851 | A | 3/1982 | Montoya |
| 4,349,123 | A | 9/1982 | Yang |
| 4,357,740 | A | 11/1982 | Brown |
| 4,416,197 | A | 11/1983 | Kehl |
| 4,417,669 | A | 11/1983 | Knowles et al. |
| 4,457,483 | A | 7/1984 | Gagne |
| 4,535,911 | A | 8/1985 | Goulter |
| 4,570,304 | A | 2/1986 | Montreuil et al. |

| | | | |
|---|---|---|---|
| 4,576,310 | A | 3/1986 | Isgar et al. |
| D284,320 | S | 6/1986 | Kubic et al. |
| 4,609,117 | A | 9/1986 | Pamment |
| 4,630,332 | A | 12/1986 | Bisbing |
| 4,630,752 | A | 12/1986 | DeMars |
| 4,664,347 | A | 5/1987 | Brown et al. |
| 4,697,312 | A | 10/1987 | Freyer |
| 4,711,161 | A | 12/1987 | Swin et al. |
| 4,729,490 | A | 3/1988 | Ziegenbein |
| 4,753,367 | A | 6/1988 | Miller et al. |
| 4,763,808 | A | 8/1988 | Guhl et al. |
| 4,765,548 | A | 8/1988 | Sing |
| 4,765,579 | A | 8/1988 | Robbins, III et al. |
| 4,785,964 | A | 11/1988 | Miller et al. |
| 4,792,039 | A | 12/1988 | Dayton |
| 4,794,973 | A | 1/1989 | Perisic |
| 4,813,592 | A | 3/1989 | Stolzman |
| 4,823,979 | A | 4/1989 | Clark, Jr. |
| 4,834,260 | A | 5/1989 | Auten |
| 4,863,053 | A | 9/1989 | Oberg |
| 4,867,339 | A | 9/1989 | Hahn |
| 4,869,391 | A | 9/1989 | Farrington |
| 4,884,717 | A | 12/1989 | Bussard et al. |
| 4,888,532 | A | 12/1989 | Josson |
| 4,892,223 | A | 1/1990 | DeMent |
| 4,892,224 | A | 1/1990 | Graham |
| D307,344 | S | 4/1990 | Massonnet |
| 4,913,308 | A | 4/1990 | Culbertson |
| 4,915,347 | A | 4/1990 | Iqbal et al. |
| 4,918,568 | A | 4/1990 | Stone et al. |
| D308,272 | S | 5/1990 | Koepsell |
| 4,923,087 | A | 5/1990 | Burrows |
| 4,944,419 | A | 7/1990 | Chandler |
| 4,948,004 | A | 8/1990 | Chich |
| 4,953,740 | A | 9/1990 | Koda |
| 4,964,523 | A | 10/1990 | Bieltvedt et al. |
| 4,972,966 | A | 11/1990 | Craft, Jr. |
| 4,996,467 | A | 2/1991 | Day |
| 5,031,793 | A | 7/1991 | Chen et al. |
| 5,048,903 | A | 9/1991 | Loblein |
| 5,054,724 | A | 10/1991 | Hutcheson |
| 5,065,272 | A | 11/1991 | Owen et al. |
| 5,065,891 | A | 11/1991 | Casey |
| D322,350 | S | 12/1991 | Craft, Jr. et al. |
| 5,072,852 | A | 12/1991 | Smith et al. |
| 5,076,462 | A | 12/1991 | Perrone |
| D323,573 | S | 1/1992 | Schneider |
| 5,090,585 | A | 2/1992 | Power |
| 5,090,785 | A | 2/1992 | Stamp |
| 5,100,087 | A | 3/1992 | Ashby |
| 5,111,958 | A | 5/1992 | Witthoeft |
| D327,760 | S | 7/1992 | Donnelly |
| D329,929 | S | 9/1992 | Knoedler et al. |
| 5,147,055 | A | 9/1992 | Samson et al. |
| 5,156,290 | A | 10/1992 | Rodrigues |
| D331,097 | S | 11/1992 | Sieren |
| 5,170,904 | A | 12/1992 | Neuhaus |
| 5,174,462 | A | 12/1992 | Hames |
| D332,852 | S | 1/1993 | Delmerico |
| D335,562 | S | 5/1993 | Evans |
| 5,213,272 | A | 5/1993 | Gallagher et al. |
| 5,222,704 | A | 6/1993 | Light |
| D337,181 | S | 7/1993 | Warman |
| 5,226,558 | A | 7/1993 | Whitney et al. |
| 5,230,525 | A | 7/1993 | Delmerico et al. |
| 5,242,074 | A | 9/1993 | Conaway et al. |
| D340,333 | S | 10/1993 | Duran et al. |
| 5,249,693 | A | 10/1993 | Gillispie et al. |
| 5,261,553 | A | 11/1993 | Mueller et al. |
| 5,265,511 | A | 11/1993 | Itzov |
| 5,295,607 | A | 3/1994 | Chang |
| 5,305,916 | A | 4/1994 | Suzuki et al. |
| 5,314,151 | A | 5/1994 | Carter-Mann |
| 5,322,179 | A | 6/1994 | Ting |
| 5,329,212 | A | 7/1994 | Feigleson |
| 5,337,581 | A | 8/1994 | Lott |
| 5,348,222 | A | 9/1994 | Patey |
| 5,353,950 | A | 10/1994 | Taylor et al. |
| 5,372,272 | A | 12/1994 | Jennings |

(56) References Cited

U.S. PATENT DOCUMENTS

| | | | |
|---|---|---|---|
| 5,381,588 | A | 1/1995 | Nelson |
| 5,385,258 | A | 1/1995 | Sutherlin |
| 5,390,818 | A | 2/1995 | LaBuda |
| 5,404,621 | A | 4/1995 | Heinke |
| 5,407,089 | A | 4/1995 | Bird et al. |
| 5,419,452 | A | 5/1995 | Mueller et al. |
| 5,471,708 | A | 12/1995 | Lynch |
| 5,474,201 | A | 12/1995 | Liu |
| 5,476,187 | A | 12/1995 | Marisco |
| 5,501,358 | A | 3/1996 | Hobday |
| D368,563 | S | 4/1996 | Brightbill et al. |
| 5,520,067 | A | 5/1996 | Gaba |
| 5,520,303 | A | 5/1996 | Bernstein et al. |
| 5,527,840 | A | 6/1996 | Chutko et al. |
| 5,531,348 | A | 7/1996 | Baker et al. |
| 5,535,913 | A | 7/1996 | Asbach et al. |
| 5,558,254 | A | 9/1996 | Anderson et al. |
| 5,560,283 | A | 10/1996 | Hannig |
| 5,584,412 | A | 12/1996 | Wang |
| D377,554 | S | 1/1997 | Adriaansen |
| 5,611,507 | A | 3/1997 | Smith |
| 5,628,424 | A | 5/1997 | Gola |
| 5,632,401 | A | 5/1997 | Hurd |
| 5,636,416 | A | 6/1997 | Anderson |
| 5,636,761 | A | 6/1997 | Diamond et al. |
| 5,644,111 | A | 7/1997 | Cerny et al. |
| 5,645,186 | A | 7/1997 | Powers et al. |
| 5,650,680 | A | 7/1997 | Chula |
| D383,277 | S | 9/1997 | Peters |
| 5,662,235 | A | 9/1997 | Nieto |
| 5,671,847 | A | 9/1997 | Pedersen et al. |
| 5,690,247 | A | 11/1997 | Boover |
| 5,695,088 | A | 12/1997 | Kasbohm |
| 5,699,929 | A | 12/1997 | Ouno |
| D388,922 | S | 1/1998 | Peters |
| D389,631 | S | 1/1998 | Peters |
| 5,704,511 | A | 1/1998 | Kellams |
| 5,724,837 | A | 3/1998 | Shin |
| 5,730,312 | A | 3/1998 | Hung |
| 5,732,845 | A | 3/1998 | Armaly, Jr. |
| 5,735,495 | A | 4/1998 | Kubota |
| 5,738,239 | A | 4/1998 | Triglia |
| 5,770,935 | A | 6/1998 | Smith et al. |
| 5,799,909 | A | 9/1998 | Ziegler |
| 5,816,431 | A | 10/1998 | Giannopoulos |
| 5,816,640 | A | 10/1998 | Nishimura |
| D401,028 | S | 11/1998 | Ahern, Jr. et al. |
| D401,383 | S | 11/1998 | Gish |
| D401,719 | S | 11/1998 | Van Leeuwen et al. |
| 5,873,643 | A | 2/1999 | Burgess, Jr. et al. |
| 5,881,896 | A | 3/1999 | Presnell et al. |
| 5,881,901 | A | 3/1999 | Hampton |
| 5,884,237 | A | 3/1999 | Kanki et al. |
| 5,887,748 | A | 3/1999 | Nguyen |
| D412,552 | S | 8/1999 | Burrows |
| 5,961,105 | A | 10/1999 | Ehrnsberger et al. |
| 5,967,355 | A | 10/1999 | Ragot |
| 5,967,392 | A | 10/1999 | Niemi et al. |
| 5,987,708 | A | 11/1999 | Newton |
| 6,000,569 | A | 12/1999 | Liu |
| 6,010,024 | A | 1/2000 | Wang |
| D420,182 | S | 2/2000 | Roudebush |
| 6,024,238 | A | 2/2000 | Jaros |
| D422,123 | S | 3/2000 | Roudebush |
| 6,036,050 | A | 3/2000 | Ruane |
| 6,079,645 | A | 6/2000 | Henreckson et al. |
| 6,091,064 | A | 7/2000 | Eaton et al. |
| 6,102,239 | A | 8/2000 | Wien |
| 6,105,859 | A | 8/2000 | Stafford |
| 6,123,215 | A | 9/2000 | Windle |
| D431,700 | S | 10/2000 | Roudebush |
| D431,888 | S | 10/2000 | Roudebush |
| 6,126,031 | A | 10/2000 | Reason |
| 6,129,233 | A | 10/2000 | Schiller |
| 6,131,861 | A | 10/2000 | Fortier, Jr. et al. |

| | | | |
|---|---|---|---|
| D435,951 | S | 1/2001 | Yang et al. |
| 6,176,455 | B1 | 1/2001 | Ma |
| 6,209,744 | B1 | 4/2001 | Gill |
| 6,211,637 | B1 | 4/2001 | Studer |
| 6,234,339 | B1 | 5/2001 | Thomas |
| 6,250,492 | B1 | 6/2001 | Verbeek |
| D445,980 | S | 7/2001 | Tjugum |
| 6,286,706 | B1 | 9/2001 | Tucker |
| 6,328,320 | B1 | 12/2001 | Walski et al. |
| 6,345,725 | B1 | 2/2002 | Lin |
| 6,364,147 | B1 | 4/2002 | Meinzinger et al. |
| 6,386,386 | B1 | 5/2002 | George |
| 6,390,321 | B1 | 5/2002 | Wang |
| 6,401,958 | B1 | 6/2002 | Foss et al. |
| D466,667 | S | 12/2002 | Lin |
| 6,519,130 | B1 | 2/2003 | Breslow |
| 6,557,716 | B1 | 5/2003 | Chan |
| D476,456 | S | 6/2003 | Englert et al. |
| D476,457 | S | 6/2003 | Verbeek |
| 6,596,983 | B2 | 7/2003 | Brent |
| D480,193 | S | 9/2003 | Wang |
| 6,612,099 | B2 | 9/2003 | Stravitz |
| 6,626,316 | B2 | 9/2003 | Yang |
| 6,626,317 | B2 | 9/2003 | Pfiefer et al. |
| D481,508 | S | 10/2003 | Wang |
| 6,632,064 | B1 | 10/2003 | Walker et al. |
| D481,846 | S | 11/2003 | Lin |
| D482,169 | S | 11/2003 | Lin |
| 6,659,407 | B2 | 12/2003 | Asaro |
| 6,681,950 | B2 | 1/2004 | Miller, Jr. et al. |
| 6,701,832 | B1 | 3/2004 | Hawkins |
| D488,604 | S | 4/2004 | Yang et al. |
| D488,903 | S | 4/2004 | Yang et al. |
| D489,503 | S | 5/2004 | Lin |
| D489,855 | S | 5/2004 | Tseng |
| D489,857 | S | 5/2004 | Yang et al. |
| D490,583 | S | 5/2004 | Yang et al. |
| 6,739,474 | B1 * | 5/2004 | Wang ....................... B60N 3/08 220/831 |
| D490,954 | S | 6/2004 | Brand |
| D491,706 | S | 6/2004 | Yang et al. |
| 6,758,366 | B2 | 7/2004 | Bourgund et al. |
| D493,930 | S | 8/2004 | Wang |
| D494,723 | S | 8/2004 | Lin |
| 6,774,586 | B1 | 8/2004 | Shih |
| 6,785,912 | B1 | 9/2004 | Julio |
| 6,812,655 | B1 | 11/2004 | Wang et al. |
| 6,814,249 | B2 | 11/2004 | Lin |
| D499,450 | S | 12/2004 | Goodman et al. |
| 6,837,393 | B1 | 1/2005 | Kuo |
| 6,857,538 | B2 | 2/2005 | Lin |
| 6,859,005 | B2 | 2/2005 | Boliver |
| D503,021 | S | 3/2005 | Yang et al. |
| D503,022 | S | 3/2005 | Lai |
| D503,502 | S | 3/2005 | Lai |
| 6,866,826 | B2 | 3/2005 | Moore et al. |
| 6,883,676 | B2 | 4/2005 | Lin |
| D507,090 | S | 7/2005 | Yang et al. |
| 6,920,994 | B2 | 7/2005 | Lin |
| D509,339 | S | 9/2005 | Lin |
| 6,974,948 | B1 | 12/2005 | Brent |
| D513,445 | S | 1/2006 | Lin |
| 6,981,606 | B2 | 1/2006 | Yang et al. |
| D517,764 | S | 3/2006 | Wang |
| D517,767 | S | 3/2006 | Yang et al. |
| D518,266 | S | 3/2006 | Yang et al. |
| 7,017,773 | B2 | 3/2006 | Gruber et al. |
| 7,033,039 | B2 | 4/2006 | Lin |
| D522,203 | S | 5/2006 | Lin |
| D522,204 | S | 5/2006 | Lin |
| 7,044,323 | B2 | 5/2006 | Yang |
| D522,704 | S | 6/2006 | Lin |
| D524,504 | S | 7/2006 | Lin |
| D525,756 | S | 7/2006 | Yang et al. |
| 7,073,677 | B2 | 7/2006 | Richardson et al. |
| 7,077,283 | B2 | 7/2006 | Yang et al. |
| 7,080,750 | B2 | 7/2006 | Wein et al. |
| D526,457 | S | 8/2006 | Lin |
| D526,458 | S | 8/2006 | Lin |

(56) References Cited

U.S. PATENT DOCUMENTS

D526,756 S 8/2006 Lin
7,086,550 B2 8/2006 Yang et al.
D528,726 S 9/2006 Lin
D530,476 S 10/2006 Lin
D530,874 S 10/2006 Lin
7,121,421 B2 10/2006 Yang et al.
D531,499 S 11/2006 Zaidman
D535,450 S 1/2007 Chen
D535,799 S 1/2007 Epps
D535,800 S 1/2007 Yang et al.
7,163,591 B2 1/2007 Kim et al.
7,168,591 B1 1/2007 Miller
D537,223 S 2/2007 Lin
D537,597 S 2/2007 Bolden
D537,599 S 2/2007 Lin
D537,601 S 2/2007 Lin
D537,999 S 3/2007 Lin
D538,995 S 3/2007 Lin
D539,498 S 3/2007 Yang et al.
D539,499 S 3/2007 Yang et al.
D540,001 S 4/2007 Zimmerman
7,204,441 B1 4/2007 Hartnett et al.
D542,001 S 5/2007 Yang et al.
D542,995 S 5/2007 Lin
D543,673 S 5/2007 Yang et al.
D544,170 S 6/2007 Lin
D544,171 S 6/2007 Lin
D544,671 S 6/2007 Saunders et al.
D545,024 S 6/2007 Liao
7,225,943 B2 6/2007 Yang et al.
D547,020 S 7/2007 Chen
7,243,811 B1 7/2007 Ramsey
D550,918 S 9/2007 Wang et al.
D552,319 S 10/2007 Gusdorf
D552,321 S 10/2007 Yang et al.
D552,823 S 10/2007 Yang et al.
D552,824 S 10/2007 Zimmerman
D552,825 S 10/2007 Yang et al.
D555,320 S 11/2007 Yang et al.
D557,869 S 12/2007 Hawker et al.
D559,494 S 1/2008 Yang et al.
D559,495 S 1/2008 Yang et al.
D562,522 S 2/2008 Daams
7,328,842 B2 2/2008 Wagner et al.
D564,169 S 3/2008 Wang
D564,723 S 3/2008 Yang et al.
D566,367 S 4/2008 Lin
D566,369 S 4/2008 Shek
D566,923 S 4/2008 Lin
D567,468 S 4/2008 Yang et al.
D568,572 S 5/2008 Yang et al.
D569,720 S 5/2008 Lablaine
7,370,919 B2 5/2008 Rapier, III
7,374,060 B2 5/2008 Yang et al.
D571,520 S 6/2008 Lin
D574,119 S 7/2008 Sofy
7,395,990 B1 7/2008 Stevens
7,398,913 B2 7/2008 McClure
7,404,499 B1 7/2008 Ramsey
D574,569 S 8/2008 Yang et al.
D575,860 S 8/2008 Wu
7,416,093 B2 8/2008 Lin et al.
D576,371 S 9/2008 Zimmerman
D578,265 S 10/2008 Presnell
D578,266 S 10/2008 Yang et al.
D578,268 S 10/2008 Yang et al.
D578,722 S 10/2008 Yang et al.
7,438,199 B1 10/2008 Tidrick
D580,120 S 11/2008 Lin
D580,613 S 11/2008 Yang et al.
D580,615 S 11/2008 Yang et al.
D581,622 S 11/2008 Presnell et al.
D582,121 S 12/2008 Wang et al.
D584,470 S 1/2009 Bizzell et al.
D585,171 S 1/2009 Bizzell et al.
D585,172 S 1/2009 Lin
D585,618 S 1/2009 Yang et al.
D586,065 S 2/2009 Lin
D586,066 S 2/2009 Lin
D586,069 S 2/2009 Lin
D586,070 S 2/2009 Lin
7,494,021 B2 2/2009 Yang et al.
D587,874 S 3/2009 Lin
D588,321 S 3/2009 Schoofs
D589,670 S 3/2009 Smeets
D593,271 S 5/2009 Yang et al.
7,530,578 B2 5/2009 Niemeyer et al.
7,540,396 B2 6/2009 Yang et al.
7,543,716 B2 6/2009 Lin
D596,820 S 7/2009 Yang et al.
7,559,433 B2 7/2009 Yang et al.
D599,074 S 8/2009 Bizzell et al.
D599,971 S 9/2009 Lin
D603,119 S 10/2009 Yang et al.
7,607,552 B2 10/2009 Efstathiou
D604,472 S 11/2009 Blanks et al.
7,614,519 B2 11/2009 Krauth et al.
7,621,420 B2 11/2009 Bandoh et al.
D608,069 S 1/2010 Schoofs
7,656,109 B2 2/2010 Yang et al.
D611,216 S 3/2010 Yang et al.
D611,217 S 3/2010 Bizzell et al.
D611,671 S 3/2010 Yang et al.
7,694,838 B2 4/2010 Yang et al.
7,703,622 B1 4/2010 Bynoe
D615,270 S 5/2010 Yang et al.
D615,722 S 5/2010 Yang et al.
7,712,285 B2 5/2010 Stravitz et al.
7,731,112 B2 6/2010 Matlin et al.
7,741,801 B2 6/2010 Fukuizumi
7,748,556 B2 7/2010 Yang et al.
7,774,202 B2 8/2010 Spengler et al.
7,781,995 B2 8/2010 Yang et al.
D623,817 S 9/2010 Yang et al.
D625,068 S 10/2010 Shannon
7,806,285 B2 10/2010 Yang et al.
D627,533 S 11/2010 Yang et al.
D627,944 S 11/2010 Wang et al.
D629,172 S 12/2010 Liao
D629,579 S 12/2010 Lin
D630,404 S 1/2011 Yang et al.
D631,221 S 1/2011 Yang et al.
D632,039 S 2/2011 Yang et al.
D632,864 S 2/2011 Yang et al.
7,888,898 B2 2/2011 Wilkerson
D634,911 S 3/2011 Yang et al.
D635,319 S 3/2011 Meyerhoffer
7,896,187 B2 3/2011 Haibel
7,906,921 B2 3/2011 Wang et al.
7,922,024 B2 4/2011 Yang et al.
7,950,543 B2 5/2011 Yang et al.
D639,520 S 6/2011 Lin
D644,390 S 8/2011 Smeets et al.
7,992,742 B1 8/2011 Kim
8,006,857 B2 8/2011 Lin
D644,806 S 9/2011 Yang et al.
D644,807 S 9/2011 Yang et al.
D649,728 S 11/2011 Campbell
8,074,833 B2 12/2011 Yang et al.
8,096,445 B2 1/2012 Yang et al.
D655,061 S 2/2012 Scaturro
8,136,688 B2 3/2012 Lee et al.
D657,108 S 4/2012 Yang et al.
D657,109 S 4/2012 Liao
D658,753 S 5/2012 Zhang et al.
8,297,470 B2 10/2012 Yang et al.
8,317,055 B2 11/2012 Zawrotny et al.
D672,520 S 12/2012 Yang et al.
D673,750 S 1/2013 Quan
D675,802 S 2/2013 Yang et al.
D675,803 S 2/2013 Yang et al.
8,393,489 B1 3/2013 Stravitz
8,418,869 B2 4/2013 Yang et al.
D684,741 S 6/2013 Harris

(56) References Cited

U.S. PATENT DOCUMENTS 8,456,120 B2 6/2013 Wang
D689,255 S 9/2013 Sun Ting Kung et al.
8,567,630 B2 10/2013 Yang et al.
8,569,980 B2 10/2013 Yang et al.
D694,382 S 11/2013 Brandenburg et al.
8,575,537 B2 11/2013 Yao et al.
8,607,932 B2 12/2013 Cooper et al.
8,672,171 B2 3/2014 Wynn et al.
8,678,219 B1 3/2014 Wang et al.
8,686,676 B2 4/2014 Yang et al.
D704,406 S 5/2014 Kern
8,716,969 B2 5/2014 Yang et al.
8,720,728 B2 5/2014 Yang et al.
D709,172 S 7/2014 Brandenburg et al.
D709,662 S 7/2014 Yang et al.
8,766,582 B2 7/2014 Yang et al.
8,807,378 B2 8/2014 Kaberna
8,807,379 B1 8/2014 Hammond
D714,510 S 9/2014 Yang et al.
D715,575 S 10/2014 Williams et al.
D716,015 S 10/2014 van de Leest
8,851,316 B2 10/2014 Barrett et al.
8,872,459 B2 10/2014 Yang et al.
D717,012 S 11/2014 Han
D717,013 S 11/2014 Han
D717,014 S 11/2014 Han
D717,015 S 11/2014 Han
D719,313 S 12/2014 Kao
D725,860 S 3/2015 Spivey et al.
D725,861 S 3/2015 Yang et al.
D729,367 S 5/2015 Markwick et al.
D729,368 S 5/2015 Markwick et al.
D730,008 S 5/2015 Yang et al.
9,051,093 B2 6/2015 Yang et al.
D755,461 S 5/2016 Wall
D758,686 S 6/2016 Beumer
D759,934 S 6/2016 Yang et al.
D762,037 S 7/2016 Chen
D765,937 S 9/2016 Chen
D766,998 S 9/2016 Kao et al.
9,434,538 B2 9/2016 Yang et al.
D770,121 S 10/2016 Chen
D771,344 S 11/2016 Yang et al.
D773,145 S 11/2016 Yang et al.
9,481,515 B2 11/2016 Yang et al.
D773,769 S 12/2016 Chen
9,573,759 B2 2/2017 Yang et al.
9,586,755 B1 3/2017 Yang et al.
D787,828 S 5/2017 Thoma et al.
D790,145 S 6/2017 Chen
D793,642 S 8/2017 Yang et al.
D794,765 S 8/2017 Brandenburg et al.
D798,016 S 9/2017 Yang et al.
D804,133 S 9/2017 Yang et al.
9,751,692 B2 9/2017 Yang et al.
9,790,025 B2 10/2017 Yang et al.
9,856,080 B2 1/2018 Yang et al.
D820,544 S 6/2018 Joseph
D825,876 S 8/2018 Chen
D827,968 S 9/2018 Chen
D829,400 S 9/2018 Yang et al.
D830,029 S 10/2018 Greenspoon et al.
D835,374 S 12/2018 Yang et al.
D835,376 S 12/2018 Yang et al.
D836,278 S 12/2018 Berberet et al.
D840,628 S 2/2019 Chang
D845,576 S 4/2019 Lu
10,279,996 B2 5/2019 Yang et al.
10,279,997 B2 5/2019 Yang et al.
D851,350 S 6/2019 Lu
D853,067 S 7/2019 Chen
D855,919 S 8/2019 Yang et al.
D858,024 S 8/2019 Yang et al.
D858,923 S 9/2019 Yang et al.
D861,076 S 9/2019 Chen
10,413,064 B1 9/2019 Lu
10,472,170 B2 11/2019 Yang et al.
D871,564 S 12/2019 Brandenburg et al.
10,494,175 B2 12/2019 Yang et al.
D874,776 S 2/2020 Spadotto
10,654,648 B1 5/2020 Rodriguez
10,683,165 B2 6/2020 Yang et al.
10,723,549 B2 7/2020 Yang et al.
D901,815 S 11/2020 Yang et al.
10,906,738 B2 2/2021 Barry
11,027,916 B2 6/2021 Yang et al.
D925,153 S 7/2021 Busch
D930,933 S 9/2021 Yang et al.
11,136,186 B2 10/2021 Yang et al.
D936,927 S 11/2021 Zeng
D938,125 S 12/2021 Zhang
D939,174 S 12/2021 Zeng
11,279,555 B2 3/2022 Yang et al.
D963,277 S 9/2022 Yang et al.
D969,291 S 11/2022 Yang et al.
11,535,449 B2 12/2022 Yang et al.
11,603,263 B2 3/2023 Yang et al.
11,801,996 B2 10/2023 Yang et al.
D1,004,069 S 11/2023 Yang et al.
2001/0002690 A1 6/2001 Rosky
2001/0013745 A1 8/2001 Fulterer et al.
2001/0020619 A1 9/2001 Pfeifer et al.
2001/0045512 A1 11/2001 Brent
2002/0009567 A1 1/2002 Brand
2002/0066736 A1 6/2002 Pyles
2002/0092853 A1 7/2002 Wang
2002/0096523 A1 7/2002 Pyles
2002/0096524 A1 7/2002 Hardesty
2002/0100758 A1 8/2002 Pyles
2002/0104266 A1 8/2002 Ranaudo
2002/0116924 A1 8/2002 Winkelmann et al.
2002/0185199 A1 12/2002 Myers et al.
2003/0089719 A1 5/2003 Berger
2003/0102316 A1 6/2003 Forest
2003/0201265 A1 10/2003 Lin
2003/0205979 A1 11/2003 Papari et al.
2003/0230576 A1 12/2003 Lin
2004/0016756 A1 1/2004 Lin
2004/0028572 A1 2/2004 Sham et al.
2004/0134924 A1 7/2004 Hansen et al.
2004/0140782 A1 7/2004 Okabe et al.
2004/0164077 A1 8/2004 Kuo
2004/0174268 A1 9/2004 Scott et al.
2004/0175303 A1 9/2004 Lin
2004/0199401 A1 10/2004 Wagner
2004/0200938 A1 10/2004 Forlivio
2004/0206758 A1 10/2004 Lin
2004/0206760 A1 10/2004 Gagnebin
2004/0250711 A1 12/2004 Ernst
2004/0251746 A1 12/2004 Ichimaru et al.
2005/0017006 A1 1/2005 Kuo
2005/0017010 A1 1/2005 Siegel et al.
2005/0029281 A1 2/2005 Westermann et al.
2005/0129803 A1 6/2005 Umeda et al.
2005/0258177 A1 11/2005 Woodson
2005/0258794 A1 11/2005 Fukuizumi
2006/0027579 A1 2/2006 Yang et al.
2006/0103086 A1 5/2006 Niemeyer et al.
2006/0110537 A1 5/2006 Huang et al.
2006/0138149 A1 6/2006 Tracy
2006/0156948 A1 7/2006 Hendriks et al.
2006/0163257 A1 7/2006 Golbert
2006/0175336 A1 8/2006 Wang
2006/0186121 A1 8/2006 Yang et al.
2006/0196874 A1 9/2006 Yang
2006/0237641 A1 10/2006 Moeller et al.
2006/0249510 A1 11/2006 Lin
2006/0278643 A1 12/2006 Chiou
2006/0283863 A1 12/2006 Coles
2007/0012699 A1 1/2007 Yang et al.
2007/0034334 A1 2/2007 Ramsey et al.
2007/0034723 A1 2/2007 Joachim et al.
2007/0045326 A1 3/2007 Tramontina et al.
2007/0090112 A1 4/2007 Kalman et al.

(56) References Cited

U.S. PATENT DOCUMENTS

| | | | |
|---|---|---|---|
| 2007/0114847 | A1 | 5/2007 | Ichimaru et al. |
| 2007/0181579 | A1 | 8/2007 | Kuo et al. |
| 2007/0209846 | A1 | 9/2007 | Wilson |
| 2007/0215622 | A1 | 9/2007 | Perez |
| 2007/0241109 | A1 | 10/2007 | Lin |
| 2007/0266637 | A1 | 11/2007 | McGowan |
| 2007/0272691 | A1 | 11/2007 | Wang et al. |
| 2007/0289972 | A1 | 12/2007 | Wynn et al. |
| 2008/0011754 | A1 | 1/2008 | Ramsey |
| 2008/0011910 | A1 | 1/2008 | Ramsey |
| 2008/0041863 | A1 | 2/2008 | Forest |
| 2008/0083627 | A1 | 4/2008 | Hamm |
| 2008/0083756 | A1 | 4/2008 | Daniels |
| 2008/0083757 | A1 | 4/2008 | Parker et al. |
| 2008/0099274 | A1 | 5/2008 | Seel |
| 2008/0128428 | A1 | 6/2008 | Beckerman |
| 2008/0164257 | A1 | 7/2008 | Boll et al. |
| 2008/0173648 | A1 | 7/2008 | Escobar et al. |
| 2008/0236275 | A1 | 10/2008 | Breed et al. |
| 2008/0237249 | A1 | 10/2008 | McGee |
| 2008/0245794 | A1 | 10/2008 | Escobar et al. |
| 2008/0257889 | A1 | 10/2008 | Kovacevich et al. |
| 2008/0257890 | A1 | 10/2008 | Kovacevich et al. |
| 2008/0257891 | A1 | 10/2008 | Kovacevich et al. |
| 2008/0264948 | A1 | 10/2008 | Kovacevich et al. |
| 2008/0264950 | A1 | 10/2008 | Kovacevich et al. |
| 2008/0272119 | A1 | 11/2008 | Efstathiou |
| 2008/0272127 | A1 | 11/2008 | Kovacevich et al. |
| 2009/0008888 | A1 | 1/2009 | Boulden |
| 2009/0071959 | A1 | 3/2009 | Cheung |
| 2009/0084788 | A1 | 4/2009 | Yang et al. |
| 2009/0136341 | A1 | 5/2009 | Kenyon |
| 2009/0214606 | A1 | 8/2009 | Bujard et al. |
| 2009/0218352 | A1 | 9/2009 | Sued et al. |
| 2009/0230131 | A1 | 9/2009 | McDuffie et al. |
| 2009/0261105 | A1 | 10/2009 | Cunningham et al. |
| 2009/0266836 | A1 | 10/2009 | Mobley |
| 2010/0006572 | A1 | 1/2010 | Chiou |
| 2010/0084235 | A1 | 4/2010 | Lu |
| 2010/0096894 | A1 | 4/2010 | Fukai |
| 2010/0122985 | A1 | 5/2010 | Peters et al. |
| 2010/0147865 | A1 | 6/2010 | Yang et al. |
| 2010/0170904 | A1 | 7/2010 | Kalman et al. |
| 2010/0176126 | A1 | 7/2010 | Shikano |
| 2010/0178105 | A1 | 7/2010 | Monneret |
| 2010/0193518 | A1 | 8/2010 | Tontarelli |
| 2010/0219191 | A1 | 9/2010 | Prosa |
| 2010/0237074 | A1 | 9/2010 | Yang et al. |
| 2010/0252557 | A1 | 10/2010 | Clements |
| 2010/0294766 | A1 | 11/2010 | Wang et al. |
| 2010/0294769 | A1 | 11/2010 | Lee et al. |
| 2011/0017735 | A1 | 1/2011 | Wang et al. |
| 2011/0049149 | A1 | 3/2011 | Shih |
| 2011/0056952 | A1 | 3/2011 | Borowski et al. |
| 2011/0139781 | A1 | 6/2011 | Jin et al. |
| 2011/0272409 | A1 | 11/2011 | Kasbohm |
| 2012/0000911 | A1 | 1/2012 | Wang |
| 2012/0111895 | A1 | 5/2012 | Fitzpatrick et al. |
| 2012/0145932 | A1 | 6/2012 | Yao et al. |
| 2012/0234836 | A1 | 9/2012 | Barrett et al. |
| 2012/0234849 | A1 | 9/2012 | Hughes et al. |
| 2012/0248149 | A1 | 10/2012 | Pelfrey |
| 2012/0261423 | A1 | 10/2012 | Zawrotny et al. |
| 2013/0002100 | A1 | 1/2013 | Badri et al. |
| 2013/0036924 | A1 | 2/2013 | Ko |
| 2013/0048641 | A1 | 2/2013 | Romano |
| 2013/0097809 | A1 | 4/2013 | Weber et al. |
| 2013/0105487 | A1 | 5/2013 | Baik |
| 2013/0105488 | A1 | 5/2013 | Quan |
| 2013/0240592 | A1 | 9/2013 | Woodruff |
| 2013/0248535 | A1 | 9/2013 | Wolfe et al. |
| 2013/0300119 | A1 | 11/2013 | Anzalon et al. |
| 2014/0183193 | A1 | 7/2014 | Hammond et al. |
| 2014/0238989 | A1 | 8/2014 | Wang et al. |
| 2014/0240964 | A1 | 8/2014 | Adachi et al. |
| 2014/0305946 | A1 | 10/2014 | Han |
| 2014/0345453 | A1 | 11/2014 | Oh et al. |
| 2015/0028751 | A1 | 1/2015 | Dobbins |
| 2015/0213705 | A1 | 7/2015 | Ehrman et al. |
| 2015/0251849 | A1 | 9/2015 | Yang et al. |
| 2015/0321841 | A1 | 11/2015 | Salas et al. |
| 2016/0035209 | A1 | 2/2016 | Martin et al. |
| 2016/0137411 | A1 | 5/2016 | Rogers |
| 2016/0162832 | A1 | 6/2016 | Thompson et al. |
| 2016/0200508 | A1 | 7/2016 | Thoma et al. |
| 2016/0239795 | A1 | 8/2016 | Burch, V et al. |
| 2017/0050404 | A1 | 2/2017 | Henken et al. |
| 2017/0052613 | A1 | 2/2017 | Alameh et al. |
| 2017/0127669 | A1 | 5/2017 | Yang et al. |
| 2017/0166167 | A1 | 6/2017 | Heller et al. |
| 2017/0176986 | A1 | 6/2017 | High et al. |
| 2019/0077595 | A1 | 3/2019 | Wang et al. |
| 2020/0148467 | A1 | 5/2020 | Yang et al. |
| 2022/0097960 | A1 | 3/2022 | Yang et al. |
| 2022/0160126 | A1 | 5/2022 | Yang et al. |
| 2022/0375320 | A1 | 11/2022 | Thompson et al. |
| 2023/0115198 | A1 | 4/2023 | Yang et al. |
| 2023/0286740 | A1 | 9/2023 | Yang et al. |
| 2023/0356235 | A1 | 11/2023 | Yang et al. |

FOREIGN PATENT DOCUMENTS

| | | | |
|---|---|---|---|
| CA | 2078813 | A1 | 9/1992 |
| CA | 2182840 | | 9/1997 |
| CA | 2519295 | | 3/2007 |
| CA | 132181 | | 6/2010 |
| CA | 2695086 | | 9/2010 |
| CA | 136938 | | 5/2011 |
| CA | 141819 | | 4/2012 |
| CA | 2778535 | A1 | 8/2013 |
| CN | 2075182 | U | 4/1991 |
| CN | 2378327 | Y | 5/2000 |
| CN | 2467467 | Y | 12/2001 |
| CN | 200964993 | Y | 10/2007 |
| CN | 101177946 | A | 5/2008 |
| CN | 201105898 | Y | 8/2008 |
| CN | 201330049 | Y | 10/2009 |
| CN | 201367221 | Y | 12/2009 |
| CN | 201372076 | Y | 12/2009 |
| CN | 201447201 | U | 5/2010 |
| CN | 201512253 | U | 6/2010 |
| CN | 201597962 | U | 10/2010 |
| CN | 201625566 | | 11/2010 |
| CN | 201907743 | U | 7/2011 |
| CN | 202213911 | U | 5/2012 |
| CN | 301947175 | S | 6/2012 |
| CN | 103207416 | A | 7/2013 |
| CN | 103300590 | A | 9/2013 |
| CN | 103303618 | A | 9/2013 |
| CN | 204587817 | U | 8/2015 |
| CN | 205169479 | U | 4/2016 |
| CN | 106690938 | A | 5/2017 |
| CN | 107032015 | A | 8/2017 |
| CN | 107495686 | A | 12/2017 |
| CN | 109775193 | A | 5/2019 |
| CN | 112407663 | A | 2/2021 |
| DE | 1610087 | | 7/1950 |
| DE | 822376 | | 11/1951 |
| DE | 1283741 | | 7/1966 |
| DE | 7503716 | U | 8/1975 |
| DE | 8436939 | | 3/1985 |
| DE | 9108341 | | 10/1991 |
| DE | 4225936 | | 2/1994 |
| DE | 19525885 | | 3/1997 |
| DE | 19617823 | | 11/1997 |
| DE | 19809331 | | 5/1999 |
| DE | 19811991 | A1 | 9/1999 |
| DE | 19824941 | A1 | 12/1999 |
| DE | 29918687 | | 3/2000 |
| DE | 19933180 | | 1/2001 |
| DE | 10036259 | A1 | 11/2001 |
| DE | 10148997 | | 4/2003 |
| DE | 10155943 | A1 | 5/2003 |
| DE | 20305521 | U1 | 6/2003 |

(56) References Cited

FOREIGN PATENT DOCUMENTS

| | | | |
|---|---|---|---|
| DE | 20217561 | | 3/2004 |
| DE | 10305311 | A1 | 8/2004 |
| DE | 10337806 | A1 | 3/2005 |
| DE | 202006016420 | U1 | 2/2007 |
| DE | 202004021206 | U1 | 4/2007 |
| EP | 0582240 | | 7/1993 |
| EP | 0903305 | A1 | 3/1999 |
| EP | 0906876 | A2 | 4/1999 |
| EP | 1094017 | A1 | 4/2001 |
| EP | 1162161 | | 12/2001 |
| EP | 1172307 | A1 | 1/2002 |
| EP | 1193690 | A1 | 4/2002 |
| EP | 0957046 | B1 | 8/2003 |
| EP | 1361176 | A1 | 11/2003 |
| EP | 1136393 | B1 | 4/2004 |
| EP | 1447342 | A2 | 8/2004 |
| EP | 1457438 | A1 | 9/2004 |
| EP | 1508537 | A1 | 2/2005 |
| EP | 1600373 | A2 | 11/2005 |
| EP | 1602599 | A2 | 12/2005 |
| EP | 1623937 | A1 | 2/2006 |
| EP | 1647503 | A1 | 4/2006 |
| EP | 1686073 | A1 | 8/2006 |
| EP | 1816090 | A1 | 8/2007 |
| EP | 1918223 | A1 | 5/2008 |
| EP | 1700799 | B1 | 8/2009 |
| EP | 001164826-0001 | | 9/2009 |
| EP | 001232904-0001 | | 10/2010 |
| EP | 2343250 | A1 | 7/2011 |
| EP | 2636613 | B1 | 3/2015 |
| EP | 3042864 | A1 | 7/2016 |
| EP | 4292955 | A2 | 12/2023 |
| ES | 1022452 | U | 4/1993 |
| ES | 2253079 | B1 | 2/2007 |
| FR | 2887152 | | 12/2006 |
| GB | 191004921 | | 6/1910 |
| GB | 968738 | A | 9/1964 |
| GB | 1555543 | A | 11/1979 |
| GB | 2046694 | A | 11/1980 |
| GB | 2384418 | | 7/2003 |
| GB | 2559346 | A | 8/2018 |
| JP | 02-152670 | | 6/1990 |
| JP | H06-56011 | | 8/1994 |
| JP | 06-272888 | | 9/1994 |
| JP | 2004-106713 | | 4/2004 |
| JP | 2004-231237 | | 8/2004 |
| JP | D1300450 | | 5/2007 |
| JP | D1300451 | | 5/2007 |
| JP | 2007-154831 | A | 6/2007 |
| JP | D1322056 | | 2/2008 |
| JP | D1398668 | | 10/2010 |
| JP | 2013-231413 | A | 11/2013 |
| JP | 2014-523329 | A | 9/2014 |
| JP | 2020-143829 | A | 9/2020 |
| KR | 20040087306 | A | 10/2004 |
| KR | 3003841370000 | | 6/2005 |
| KR | 3004095430000 | | 3/2006 |
| KR | 3004095430001 | | 7/2006 |
| NL | 6908550 | | 12/1970 |
| NL | 1005057 | C2 | 7/1998 |
| TW | 183920 | | 5/1992 |
| TW | 230977 | | 9/1994 |
| TW | 395392 | | 6/2000 |
| TW | D112733 | | 9/2006 |
| TW | D129485 | | 7/2009 |
| TW | D133382 | | 2/2010 |
| TW | D133678 | | 3/2010 |
| TW | 145989 | | 3/2012 |
| TW | D162495 | | 8/2014 |
| TW | 201720729 | | 6/2017 |
| WO | WO 92/02430 | A1 | 2/1992 |
| WO | WO 96/33671 | | 10/1996 |
| WO | WO 2005/080232 | A1 | 9/2005 |
| WO | WO 2005/097329 | A1 | 10/2005 |
| WO | WO 2006/079263 | A1 | 8/2006 |
| WO | WO 2007/139570 | | 12/2007 |
| WO | WO 2009/114495 | A1 | 9/2009 |
| WO | WO 2015/134902 | A1 | 9/2015 |
| WO | WO 2015/138625 | A1 | 9/2015 |
| WO | WO 2016/054109 | A1 | 4/2016 |
| WO | WO 2016/133407 | A1 | 8/2016 |
| WO | WO 2021/180516 | A1 | 9/2021 |
| WO | WO 2023/064221 | A1 | 4/2023 |
| WO | WO 2023/215375 | | 11/2023 |

OTHER PUBLICATIONS

Web page showing picture of Hero Bullet trash can, archived Nov. 17, 2004, downloaded from http:/web.archive.org/web/20041117003115/http://www.simplehuman.com/images/hero_bullet.jpg.

Simplehuman, LLC's Complaint against Defendant Volume Distributors, Inc.'s, Civil Action No. 2:23-cv-2219, Mar. 24, 2023, in 87 pages.

Volume Distributors, Inc.'s Answer to Complaint of Simplehuman, LLC, Civil Action No. 2:23-cv-2219, May 26, 2023, in 9 pages.

Volume Distributors, Inc.'s Invalidity Contentions (with Exhibits A1-A4 and B1-B3), *Simplehuman, LLC* v. *Volume Distributors, Inc.*, Civil Action No. 2:23-cv-2219, Jul. 28, 2023, in 516 pages.

Volume Distributors, Inc.'s Preliminary Proposed Claim Constructions and Identification of Extrinsic Evidence Pursuant to S.P.R. 3.2, Demand for Jury Trial, *Simplehuman, LLC* v. *Volume Distributors, Inc.*, Civil Action No. 2:23-cv-2219, Aug. 25, 2023, in 7 pages.

Simplehuman, LLC's Proposed Construction for Identified Patent Claim Terms, *Simplehuman, LLC* v. *Volume Distributors, Inc.*, Civil Action No. 2:23-cv-2219, Aug. 25, 2023, in 8 pages.

Volume Distributors, Inc.'s Amended Invalidity Contentions (with Exhibits A1-A4 and B1-B3), *Simplehuman, LLC* v. *Volume Distributors, Inc.*, Civil Action No. 2:23-cv-2219, Sep. 12, 2023, in 527 pages.

Order re Claim Construction, *Simplehuman, LLC* v. *Volume Distributors, Inc.*, Civil Action No. 2:23-cv-2219, Dec. 20, 2023, in 28 pages.

Simplehuman, LLC's Complaint against Defendant Volume Distributors, Inc.'s, Civil Action No. 2:23-cv-09537, Nov. 10, 2023, in 80 pages.

Volume Distributors, Inc.'s Answer to Complaint of Simplehuman, LLC, Civil Action No. 2:23-cv-09537, Dec. 20, 2023, in 6 pages.

Volume Distributors, Inc.'s Invalidity Contentions, *Simplehuman, LLC* v. *Volume Distributors, Inc.*, Civil Action No. 2:23-cv-09537, Feb. 12, 2024, in 103 pages.

Volume Distributors, Inc.'s Petition for Inter Partes Review of U.S. Pat. No. 10,683,165, Case No. IPR2024-00050, Oct. 16, 2023, in 118 pages.

Decision Granting Institution of Inter Partes Review of U.S. Pat. No. 10,683,165, Case No. IPR2024-00050, Apr. 10, 2024, in 42 pages.

U.S. Appl. No. 15/476,285, filed Mar. 31, 2017, Yang et al.

YouTube.com, "Automatic trash can pull out cabinet with Arduino (DIY)", dated Oct. 9, 2019, https://www.youtube.com/watch?v=mmcgTaE45_Y, entire video, including screenshot in 1 page.

YouTube.com, "trash pullout with servo drive installed", dated Jun. 17, 2011, https://www.youtube.com/watch?v=tO1SbtllEh8, entire video, including screenshots in 3 pages.

Trento Corner 23 Trash Can, Hailo product webpage, May 2008, http://www.hailo.de/html/default.asp?site=12_71_107&lang=en.

alzashop.com, Simplehuman 45L Pedal Rectangular White Plastic Stainless Steel Trash Can, https://www.alzashop.com/simplehuman-45l-pedal-rectangular-white-plastic-stainless-steel-d5841987.htm, site visited Jul. 20, 2021, in 3 pages.

Excerpts of Simplehuman, LLC's Responses to Volume Distributors Inc.'s Third Set of Interrogatories (Nos. 16-18), Inc.'s, Civil Action No. 2:23-cv-2219, Apr. 11, 2024, in 18 pages.

Simplehuman, LLC, photos of a trashcan that was described in a printed publication and/or in public use or on sale in the U.S. more than one year before Mar. 9, 2012, in 8 pages.

Simplehuman, LLC's Complaint against International Textile & Apparel, Inc., Civil Action No. 2:24-cv-02068, Mar. 13, 2024, in 38 pages.

(56) References Cited

OTHER PUBLICATIONS

International Textile & Apparel, Inc.'s Answer to Complaint of Simplehuman, LLC, Civil Action No. 2:24-cv-02068, Jun. 3, 2024, in 23 pages.

* cited by examiner

TRASH CAN ASSEMBLY

CROSS-REFERENCE TO RELATED APPLICATIONS

This application is a continuation of U.S. patent application Ser. No. 18/182,284, filed Mar. 10, 2023, which is a continuation of U.S. patent application Ser. No. 17/449,408, filed Sep. 29, 2021, now U.S. Pat. No. 11,603,263, which is a continuation of U.S. patent application Ser. No. 16/901,376, filed Jun. 15, 2020, now U.S. Pat. No. 11,136,186, which is a continuation of U.S. patent application Ser. No. 15/783,370, filed Oct. 13, 2017, now U.S. Pat. No. 10,683,165, which is a continuation of U.S. patent application Ser. No. 13/787,638, filed Mar. 6, 2013, now U.S. Pat. No. 9,790,025, which claims the priority benefit under 35 U.S.C. § 119(e) of U.S. Provisional Patent Application No. 61/609,233, filed Mar. 9, 2012. The entirety of each of the aforementioned applications is incorporated herein by reference.

BACKGROUND

Field

Some embodiments relate to power transfer devices, such as mechanisms for operating lids or doors for receptacles.

Description of the Related Art

Receptacles and other devices with mechanisms for transferring power to a subcomponent, such as a lid or a door, are used in a variety of different settings. For example, in both residential and commercial settings, trash cans and other devices often have lids for protecting or preventing the escape of the contents of the receptacle. Some trash cans include lids or doors to prevent odors from escaping and to hide the trash within the receptacle from view. Additionally, the lid of a trash can help prevent contamination from escaping from the receptacle.

Some commercially available trash cans have powered or manually operated lids. Such cans generally include a motor that drives a gear assembly, which in turn drives the lid open and closed. Such trash cans can include a sensor positioned on or near the lid. Such a sensor can be configured to detect movement, such as a user's hand being waived near the sensor, as a signal for opening the lid. When such a sensor is activated, a motor within the trash receptacle opens the lid or door and thus allows a user to place items into the receptacle. Afterwards, the lid can be automatically closed.

However, certain conventional power or manually operated lids present some difficulties. For example, users of current trash cans with power operated lids can experience problems if the trash within the receptacle or can is piled higher than the level of the lid itself. If the trash or other material within the can is higher than the level of the lid itself, the lid will be unable to completely close. This can cause the motor or batteries to wear down, continue running, and/or ultimately fail. It can also force the user to reset the controller, remove trash, or manually compress the trash until the lid can be closed.

A number of other problems are associated with the deployment, use, and removal of receptacle liners, such as trash bags. A common problem is associated with maintaining the trash bag suspended at the top of the trash open with the mouth of the trash bag opened. For example, a user typically needs to fold the top edge of the trash bag over the top edge of the trash can or its internal liner to maintain the mouth of the trash bag opened at the top of the trash can or an internal liner. However, the weight of the waste materials deposited into the trash bag may cause the trash bag to slip from the mouth of the trash can and fall into the interior of the trash can. This can result in the undesirable spillage of the waste material inside the trash bag and/or the inconvenience of having to reach into the interior of the trash can to retrieve and reposition the bag onto the trash can.

Further, problems can exist when a user manually opens and closes the lid or door of a trash receptacle configured to transfer power to the lid or door. Whether intentional or accidental, the act of directly manually opening or closing the lid (e.g., not opened and/or closed by the motor or another power transmission device, such as a foot pedal) may, for example, wear down, strip or lead to the failure of the components and parts of the power operated trash receptacle, such as the motor or gears. For instance, when the lid is manually operated, certain of the gears in connection with the lid are encouraged to move (e.g., rotate and/or translate). However, because the motor may be relatively difficult to rotate when not being operated, the motor may inhibit one or more of the gears from moving. Thus, when the lid is manually operated, a stress can result between the gears that the lid is urging to move and the gears that the motor is inhibiting from moving. Such a stress can result in damage to the gears, motor, lid, or other components of the receptacle. For instance, such stress can strip one or more teeth of the gears. Damage to the gears can, for example, result in reduced control over the motion of the lid, cause noise, and even inhibit or prevent the motor from operating the lid.

SUMMARY

Various embodiments of a trash can assembly (e.g., a receptacle configured to receive refuse, recyclable materials, or otherwise), and related methods, are provided. In some embodiments, the trash can assembly includes a body component, such as a shell or housing. In some embodiments, the body component is made of a metal, such as stainless steel. The body component can be configured to receive a portion of a removable liner, such as a trash bag, bin bag, bin liner, or otherwise.

Various embodiments of the trash can assembly include a trim member, such as a plastic or metal edge, border region, or otherwise. The trim member can be pivotally coupled (e.g., rotatably, hingedly, or otherwise) with the body. The trim member can be configured to move between a closed position and an open position. When the trim member is in the closed position and an upper portion (e.g., edge, ridge, rim, or otherwise) of the removable liner is positioned over an upper edge (e.g., lip, rim, or otherwise) of the body component, the trim member can be configured to engage the upper edge of the body component to secure (e.g., pinch, grasp, or otherwise) the upper portion of the removable liner between the trim member and the upper edge of the body component.

In some embodiments, the trash can assembly includes a lid, such as a cover, top, closure member, or otherwise. The lid can be pivotably coupled with the body component and configured to move between a first position (e.g., closed or shut) and a second position (e.g., open). In some implementations, a periphery (e.g., an edge and/or radially outer portion) of the lid can be generally received in the trim when the trim is in the closed position and the lid is in the first position, the periphery of the lid being positioned generally outside of the trim when the trim is in the closed position and the lid is in the second position. In some embodiments, the lid is made of the same material as the body. In some embodiments, the lid is made of the same material as the trim member.

In some embodiments, the trim member includes a wall extending generally downwardly (e.g., generally transverse direction to a top surface of the trim member, generally toward a base of the trash can assembly, or otherwise) from a top surface of the trim member. In certain variants, the trim member includes a liner retention feature (e.g., one or more hooks, wings, detents, snaps, magnets, or otherwise) positioned on an inside surface of the wall. In some embodiments, the liner retention feature includes an inwardly (e.g., radially inwardly, in a direction generally toward the body, or otherwise) extending flap positioned on an inner surface of the wall. The inwardly extending flap can be configured to receive a portion of the upper edge of the body component. For example, in some embodiments, the upper edge of the body component includes an annular lip and the inwardly extending flap includes an engagement element (e.g., recess, aperture, channel, protrusion, or otherwise) configured to secure a portion of the removable liner between the flap and the annular lip.

In some embodiments, the trim member includes a retaining mechanism, such as a latch, detent, or other securing and/or holding device. The retaining mechanism can be configured to maintain the trim member in the open position, thereby allowing a user to mount the removable liner in the trash can assembly. In some embodiments, the retaining mechanism includes a first cam structure (e.g., arm, wheel, shaft, cylinder, gear, etc.) and a second cam structure. The first cam structure can be configured to be received in a holding feature (e.g., a recess, channel, or otherwise) of the second cam structure as the trim member moves (e.g., rotates, slides, translates, or otherwise) toward the open position.

In some embodiments, the trash can assembly includes a power operated driving mechanism, such as a motor and shaft. The power operated driving mechanism can be configured (e.g., with a linkage or gearing) to move the lid between the first and second positions. In some implementations, the power operated driving mechanism is activated by a sensor, such as an infrared sensor, proximity sensor, ultrasonic sensor, or otherwise. For example, a signal from the sensor can be provided to a controller, which can be configured to regulate the operation of the power operated driving mechanism to move the lid between the first and second positions based on the signal. In certain variants, the sensor is configured to sense (e.g., detect, monitor, measure, or otherwise) the presence and/or lack thereof of an object or user in a vicinity of the trash can assembly. For example, the sensor can sense the presence of a user generally in front and/or above the trash can assembly, and thus signal for the lid to be opened. Some implementations of the sensor are configured to sense the presence and/or lack thereof of an object or user in a volume of space relative to the trash can assembly, such as within a generally conical volume of space above the trash can assembly. In some embodiments, at least one of the power operated driving mechanism and the sensor is deactivated (e.g., generally depowered, turned off, or otherwise) when the trim member is in the open position. Certain such implementations can, for example, reduce the likelihood of false positive readings and/or can conserve energy.

In accordance with some implementations, a trash can assembly includes a body component. The trash can assembly can have a lid mounted relative to the body component. The lid can be configured to move between open and closed positions. In some variants, the lid has a lid driving mechanism. Certain embodiments of the trash can assembly include a power operated driving mechanism that includes a motor coupled (e.g., directly or indirectly) with a shaft. In various embodiments, the motor is powered (e.g., by alternating current, direct current, or otherwise). In some implementations, the motor is configured to receive electrical power from one or more batteries. In some implementations, solar panels provide power to at least some components of the trash can, such as the motor.

Certain implementations of the trash can assembly include a clutch mechanism, such as a selectively engageable power and/or torque transfer member. In some variants, the clutch mechanism can be engageable with (e.g., abutted against, securable with, connectable to, or otherwise) the lid driving mechanism. The clutch mechanism can be configured to receive torque from the motor, such as via the shaft, and to transmit the torque to the lid driving mechanism to move the lid between the open and closed positions. The lid driving mechanism and the clutch member can be configured to allow a user to manually move (e.g., push, pull, rotate, translate, lift, etc.) the lid between the open and closed positions substantially without applying a force (e.g., torque) to at least one of: the motor, the shaft, and the clutch mechanism. In some embodiments, the lid driving mechanism and the clutch member can be configured to allow a user to manually move the lid between the open and closed positions substantially without applying a force (e.g., torque) to at least two of: the motor, the shaft, and the clutch mechanism (e.g., the motor and the shaft, the shaft and the clutch, and/or the motor and the clutch). In certain implementations, the lid driving mechanism and the clutch member can be configured to allow a user to manually move the lid between the open and closed positions substantially without applying a force (e.g., torque) to the motor, the shaft, and the clutch mechanism.

In some embodiments, the lid driving mechanism is attached to a bottom surface of the lid, such as an underside, back, and/or surface generally directed toward the base of the trash can assembly. The lid driving mechanism can be configured to directly or indirectly abut (e.g., contact, touch, or otherwise) with the clutch mechanism. In some embodiments, when the clutch mechanism is operated (e.g., rotated by the shaft and/or the motor), such abutment can result in the lid driving mechanism being moved (e.g., rotated), thereby moving the lid between the open and closed positions.

According to some implementations, the lid driving mechanism includes first and second flanges, such as flaps, wings, protrusions, or otherwise. The flanges can be configured to abut with first and second torque transmission members (e.g., arms, shafts, etc.) of the clutch mechanism, respectively. In certain variants, at least one of the first and second flanges extend radially inwardly (e.g., generally toward the body, generally toward a radial center of the trash can assembly, or otherwise). According to certain variants, rotation of the clutch mechanism results in rotation of the first and second flanges, which in turn results in movement (e.g., rotation) of the lid between the open and closed positions. In some embodiments, the first and second flanges are positioned on the lid. For example, the first and second flanges can be molded or otherwise formed with the lid, or joined (e.g., by welding or adhesive) with the lid.

Some implementations include at least one circumferential space (e.g., a gap or recess) between the first and second flanges. In certain embodiments, at least one of the first and second torque transmission members is configured to be positioned within the at least one circumferential space. Certain embodiments include first and second circumferential spaces between the first and second flanges, with the first torque transmission member being positioned in the first circumferential space and the second torque transmission member being positioned in the second circumferential space.

In some embodiments, the first and second torque transmission members have at least one arm extending from a central body of the clutch mechanism. For example, some embodiments include first and second arms extending radially outward from the central body. In some variants, at least one of the arms has a first surface and second surface. The first surface can be configured to abut with the first flange and the second surface can be configured to abut with the second flange. In certain implementations, when the first surface is abutted with the first flange, a first circumferential distance is defined between the second surface (e.g., non-abutted surface) and the second flange. In some embodiments, the first circumferential distance is greater than or equal to the amount of rotation of the lid between the closed and open positions. For example, in certain variants, the rotation of the lid between the closed and open positions can be at least about 80° and the circumferential distance can be greater than or equal to about 80°. In some embodiments, the circumferential distance being greater than or equal to the amount of rotation of the lid between the closed and open positions facilitates a user being able to manually (e.g., without operating the driving mechanism, etc.) open and/or close the lid without applying a force to the arms.

In some embodiments, the trash can assembly includes one or more lid position sensing elements, such as flagging members, proximity sensors, interrupt-type sensors, potentiometers, or otherwise. In certain implementations, the lid position sensing elements are communicatively (e.g., electrically connected, etc.) connected with a controller, such as a processor or other electrical circuit configured to execute one or more algorithms. The controller can be configured to determine whether the lid is in the open or closed position, such as based on a signal from the lid position sensing elements.

In accordance with some embodiments, a trash can assembly includes a body component and a lid that is mounted relative to the body component and is configured to move between open and closed positions. The trash can assembly can include a driving mechanism operable to move the lid between the open and closed positions. Some embodiments of the driving mechanism can include a motor, a shaft, and an end member. The motor can be configured to rotate the shaft, and the shaft can be configured to rotate the end member. In some embodiments, the end member is generally rigidly coupled (e.g., fixed or secured) with the shaft such that the end member is generally prevented from rotating relative to the shaft.

In some variants, the driving mechanism includes a clutch mechanism. The clutch mechanism can be rotatably engageable (e.g., able to be engaged and disengaged) with the lid. The driving mechanism can be adapted to receive torque from the end member, so as to move the lid between the open and closed positions. The clutch mechanism can be configured to move (e.g., rotate, translate, slide, etc.) relative to the end member when the lid is moved between the opened and closed positions generally without operation of the driving mechanism (e.g., generally without rotational movement of the motor and/or the shaft relative to the body).

In some embodiments the driving mechanism includes a biasing member, such as a spring, elastic member or otherwise. The biasing member can be configured to bias (e.g., to apply a force to) the clutch mechanism into engagement (e.g., contact, abutment, securement, or otherwise) with the end member. In certain implementations, the bias of the biasing member can facilitate torque from the motor being transmitted to the clutch mechanism via the engagement between the end member and the clutch mechanism.

In some embodiments, the clutch mechanism is configured to move (e.g., translate and/or rotate) relative to the end member and/or the shaft. For example, in some embodiments, the clutch mechanism can move relative to the end member and/or the shaft when the lid is moved between the opened and closed positions generally without operation of the driving mechanism, such as when the lid is opened or closed manually (e.g., by hand). In some embodiments, when the clutch mechanism moves relative to the end member and/or the shaft, the clutch mechanism translates toward the motor along a portion of a longitudinal length of the shaft and/or rotates relative to the end member. In some embodiments, when movement of the clutch mechanism relative to the end member and/or the shaft ceases, the biasing member is configured to move (e.g., to translate and/or rotate) the clutch mechanism towards and/or into engagement with the end member.

In some embodiments, the clutch mechanism and the end member include corresponding cam surfaces. In certain implementations, the corresponding cam surfaces are configured to allow the clutch mechanism to translate and rotate relative to the end member. In some embodiments, the clutch mechanism includes a first inclined cam surface and the end member includes a second inclined cam surface. The first and second inclined cam surfaces can be configured to allow mating engagement between the clutch mechanism and the end member. In some embodiments, when the lid is moved between the opened and closed positions generally without operation of the driving mechanism, the first and second inclined cam surfaces slide (e.g., translate and/or rotate) relative to each other.

BRIEF DESCRIPTION OF THE DRAWINGS

The above-mentioned and other features of the trash cans disclosed herein are described below with reference to the drawings of certain embodiments. The illustrated embodiments are intended to illustrate, but not to limit the disclosure. The drawings contain the following Figures.

DETAILED DESCRIPTION OF CERTAIN EMBODIMENTS

The various embodiments of a system for transmitting power for opening and closing a lid or door of a receptacle, such as a trash can, or other device is disclosed in the context of a trash can. The present disclosure describes certain embodiments in the context of a trash can due to particular utility in this context. However, the subject matter of the present disclosure can be used in many other contexts as well, including, for example, commercial trash cans, doors, windows, security gates, and other larger doors or lids, as well as doors or lids for smaller devices such as high precision scales, computer drives, etc. The embodiments and/or components thereof can be implemented in powered or manually operated systems.

Figure 1:
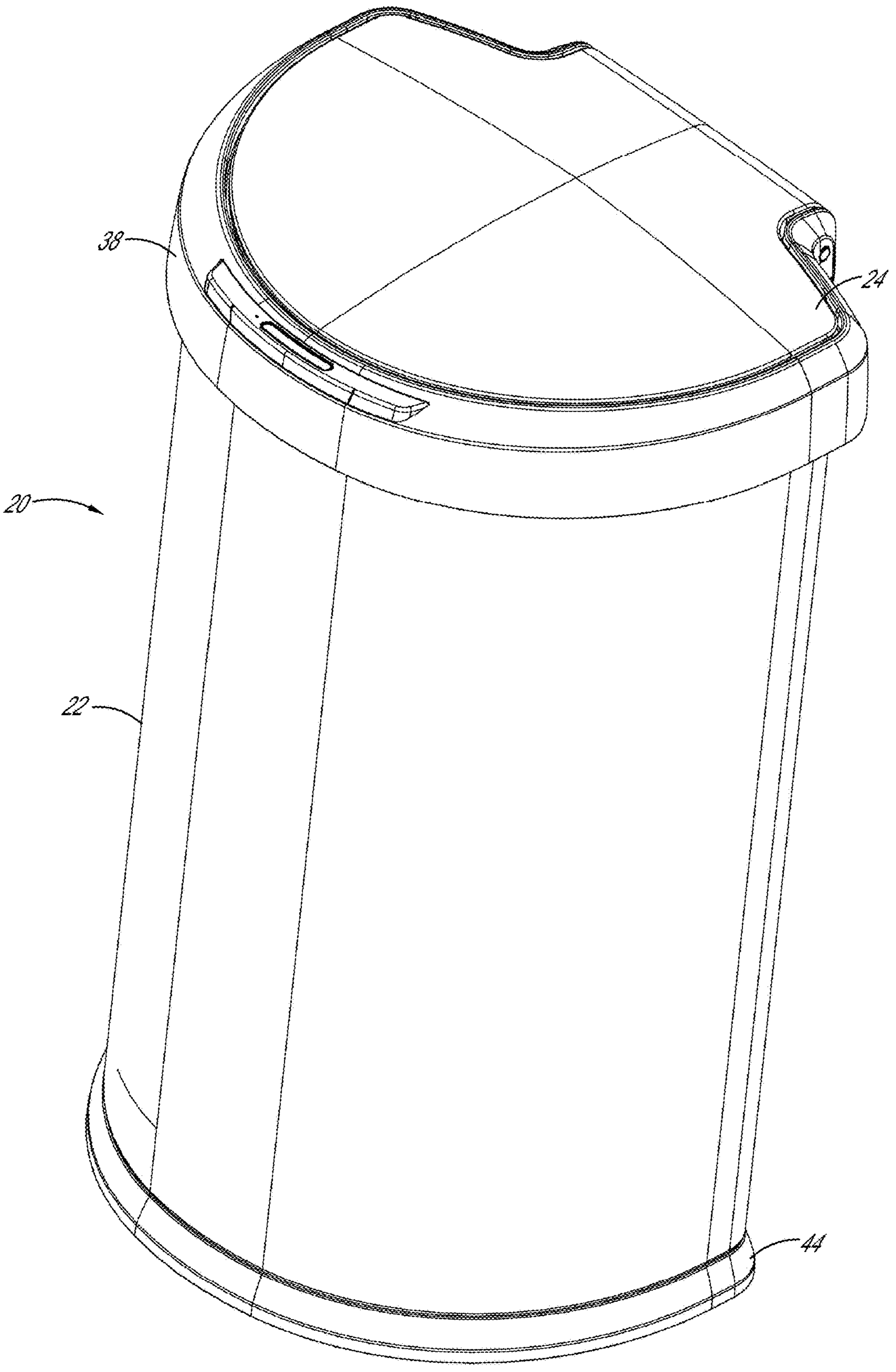
FIG. 1 is a top, front, and left side perspective view of an embodiment of an enclosed receptacle, with a lid and a trim member in a closed position.
Figure 2:
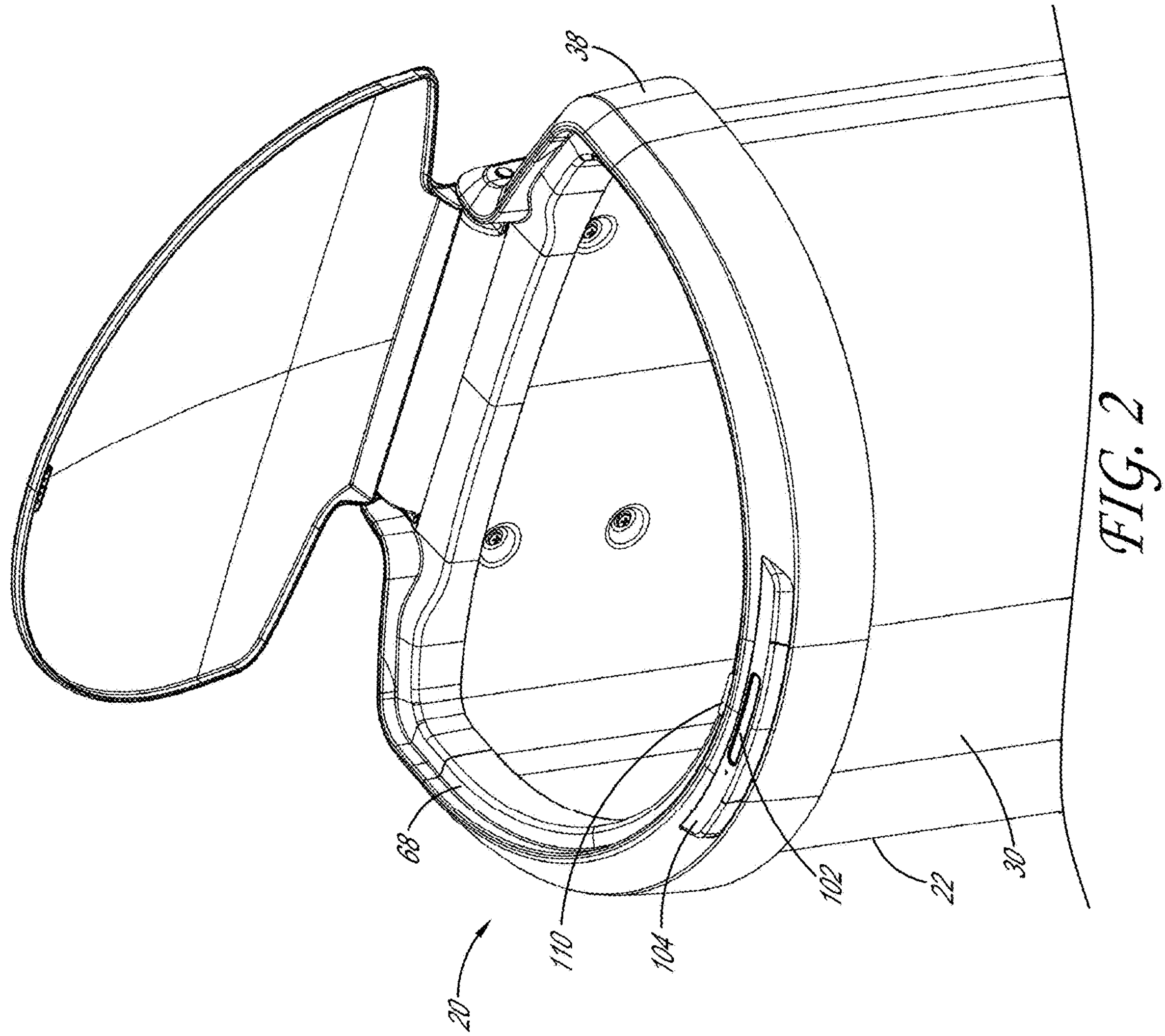
FIG. 2 is an enlarged top, front, and left side perspective view of the receptacle illustrated in FIG. 1, with the lid in an open position and the trim member is the closed position.
Figure 3:
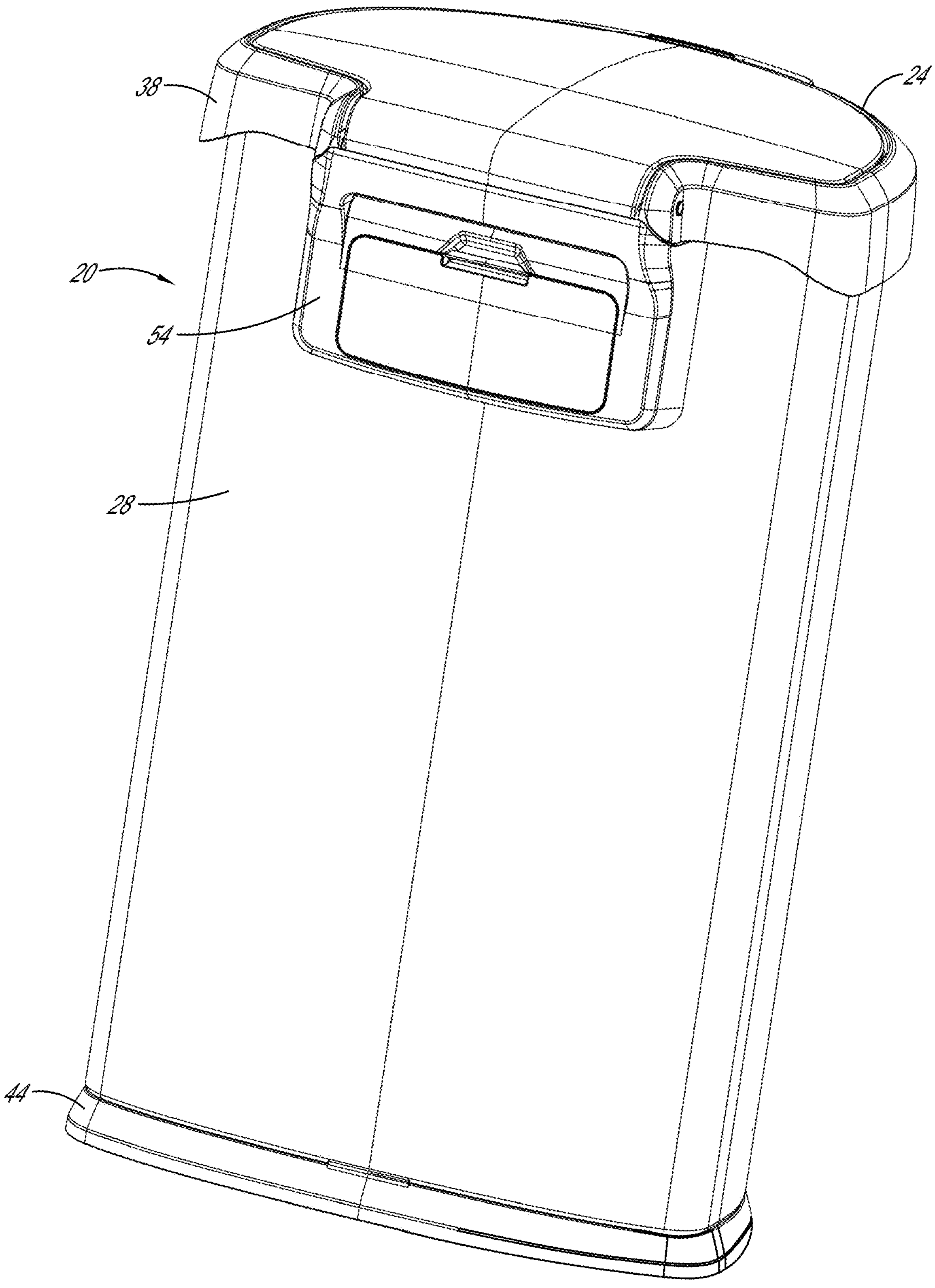
FIG. 3 is a top, rear, and right side perspective view of the receptacle shown in FIG. 1.

With reference to FIGS. 1-3, a trash can assembly 20 can include a body or shell component 22 and lid 24 and other modular pieces or components. The trash can assembly 20 is generally easy to assemble and maintain. It can have minimal parts and have a compact design. Lid 24 can include door components, such as an air filter (not shown). The trash can assembly 20 can be configured to rest on a floor, and can be of varying heights and widths depending on, among other things, consumer need, cost, and case of manufacture. Additional details and examples of trash can assemblies that can be used with, or instead of, components discussed herein are provided in U.S. Patent Application Publication No. 2011/0220647, filed Mar. 4, 2011, and U.S. Patent Application Publication No. 2009/0194532, filed Feb. 1, 2008, the entirely of each of which is incorporated herein by reference.

The trash can assembly 20 can include the body component 22. In some embodiments, the trash can assembly can be configured to receive a liner or trash bag (not shown), which can be retained at least partly within the body component 22. For example, an upper peripheral edge of the body component 22 can be configured to support an upper peripheral edge of the liner such that the liner is suspended and/or restrained by its upper peripheral edge within the body component 22. In some embodiments, the trash can assembly 20 can include a liner support member (not shown) supported by the body component 22 and configured to support the liner at least partly within the interior of the body component 22. In some embodiments, the body component 22 is configured such that the liner can be seated on a lower portion of the body component 22.

Figure 4:
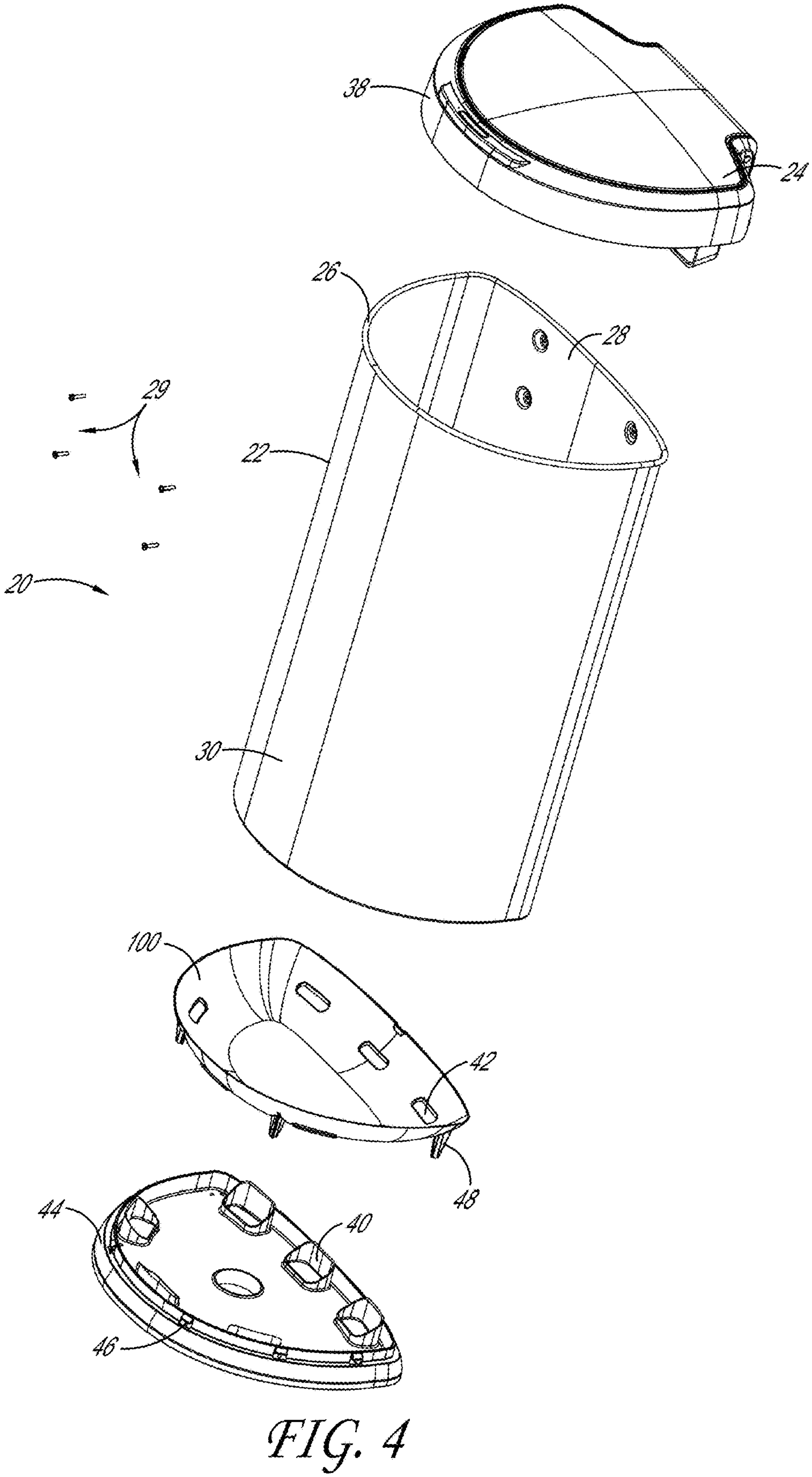
FIG. 4 is an exploded top, front, and left side perspective view of an embodiment of an enclosed receptacle with the lid closed.

With reference to FIG. 4, in some embodiments, the body component 22 includes an upper edge 26. As illustrated, the upper edge 26 of the body component 22 can be rolled, include an annular lip, or otherwise include features that extend outwardly from a generally vertical wall of the body component 22. In some embodiments, the upper edge 26 has a generally rounded cross-section. Other designs can also be used.

The body component 22 can assume many configurations. The non-limiting embodiments of FIGS. 1-3 illustrate the body component 22 having a generally semi-circular configuration with a rear wall 28 and a curved, front wall 30. However, other configurations can also be used, for example, rectangular. The liner or trash bag (not shown) can have the same general configuration, or a different configuration from the body component 22. The body component 22 can be made from plastic, steel, stainless steel, aluminum or any other material.

As illustrated in FIG. 4, the trash can assembly 20 can include a base portion 44. The base portion 44 can have a generally annular and curved skirt upper portion and a generally flat lower portion for resting on a surface, such as a kitchen floor. The base portion 44 of the trash can assembly 20 can be made integrally, monolithically, or separate from the body component 22. In some implementations, the base portion 44 comprises plastic, metal (e.g., steel, stainless steel, aluminum, etc.) or any other material. In some embodiments, such as those in which the body component 22 is metal (e.g., stainless steel), the base portion 44 can be a plastic material. In some embodiments, the base portion 44 includes projections 40 that are open or vented to the ambient environment (e.g., thorough the generally flat lower portion of the base portion 44), as will be discussed in further detail below. As illustrated, certain embodiments of the base portion 44 include a generally centrally located passage thorough the generally flat lower portion of the base portion 44.

In some embodiments, the base portion 44 can be connected with or attached to the body component 22 by connection components 46, such as hooks and/or fasteners (e.g., screws). For example, in some embodiments, the base portion 44 includes hooked tabs that are configured to connect with a lower edge (e.g., a rolled edge) of the body component 22. In some embodiments, the hooked tabs engage the lower edge of the body component 22, such a by snap-fit connection. In some embodiments, the base portion 44 and the body component 22 are joined with adhesive, welding, hooks and similar attachment mechanisms.

In some embodiments, a liner insert 100 is connected with, or attached to, the base portion 44. In some embodiments, the liner insert 100 can have support members, such as legs 48, which can support and/or elevate the liner insert 100 above an interior bottom of the base portion 44. In some embodiments, the legs 48 are joined with the base portion 44 (e.g., with fasteners, welding, etc.).

In some embodiments, the liner insert 100 is configured to generally support and/or cradle a lower portion of a trash bag disposed in the trash can assembly 20. For example, as illustrated, the liner insert 100 can be generally concave or bowl-shaped. In some embodiments, the liner insert 100 is configured to protect a trash bag from rupture or damage and retain spills. For instance, the liner insert 100 can have a generally smooth surface to reduce the likelihood of the trash bag being torn or punctured by contact with the liner insert 100. Several embodiments of the liner insert 100 thus can reduce the chance of damage to the trash bag even in embodiments of the trash can assembly 20 that do not utilize a generally rigid liner that extends along some or all of the height of the body component 22.

In certain implementations, the liner insert 100 forms a seal (e.g., generally liquid resistant) with a lower portion of the body component 22. In some embodiments, the liner insert 100 can include openings 42 that are configured to correspond to, or mate with, the projections 40 located on the interior bottom surface of the base portion 44, thereby placing the openings 42 and the projections 40 in fluid communication. By aligning the openings 42 of the liner insert 100 and the projections 40 of the base portion 44, the openings 42 can allow ambient air to pass into and out of the interior of the trash can assembly, which can inhibit or prevent the occurrence a negative pressure region (e.g., in comparison to ambient) inside the trash can assembly 20 when a user removes a trash bag from the trash can assembly 20. Further, in certain variants, when a user inserts refuse or other materials into the trash bag in the trash can assembly 20, air within the trash can assembly 20 can exit via the openings 42 and the projections 40, thereby inhibiting the occurrence of a positive pressure region (e.g., in comparison to ambient) inside the trash can assembly 20 and allowing the trash bag to freely expand.

Figure 5:
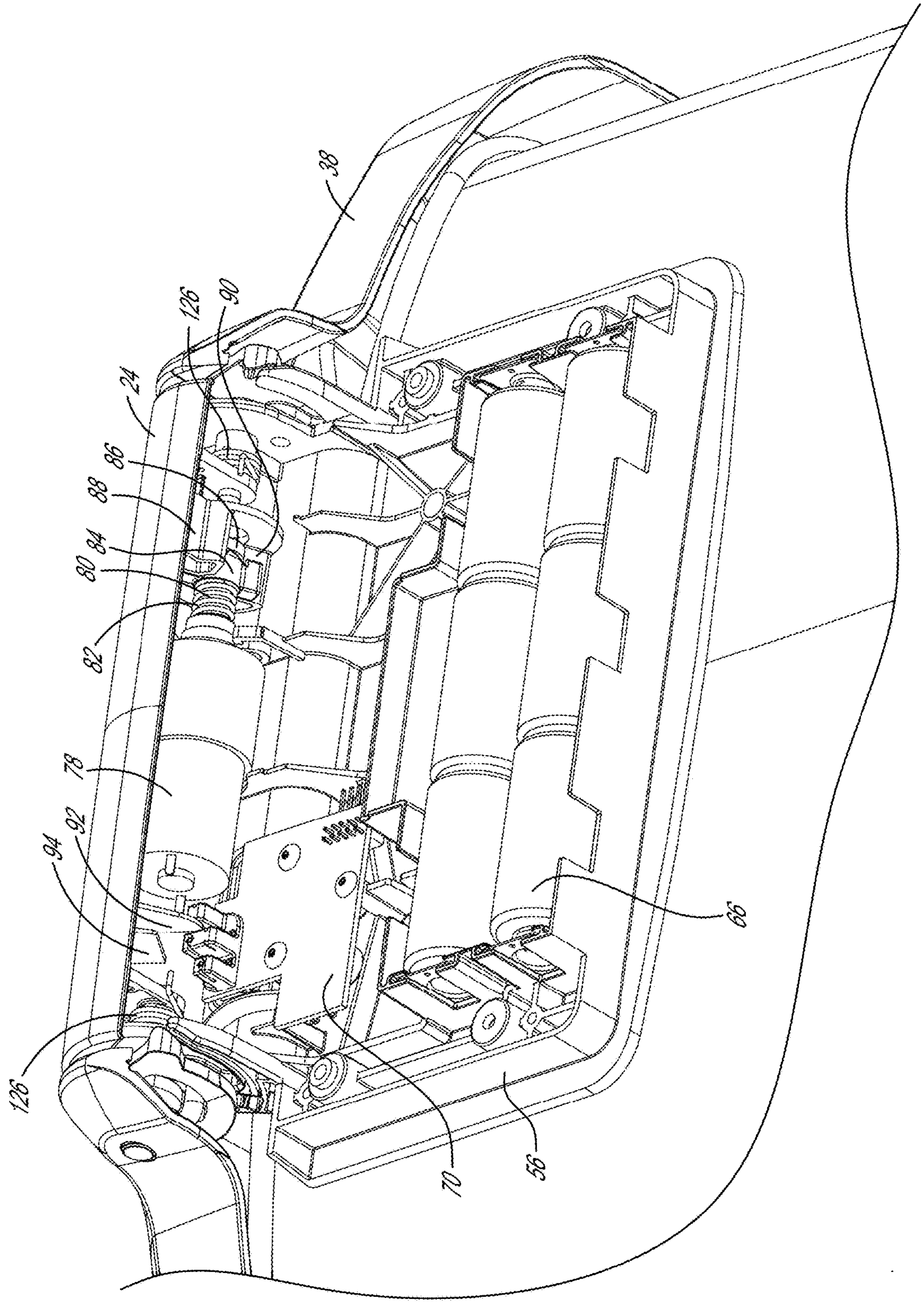
FIG. 5 is an enlarged rear perspective view of the receptacle shown in FIG. 1, with a back cover removed.

As described above, the trash can assembly 20 can include the rear wall 28. Along the rear wall 28, the trash can 20 can include a back cover 54. The back cover 54 can enclose and/or protect a back side enclosure 56, as illustrated in FIG. 5. In some embodiments, the back side enclosure 56 can house the power source 66 for the trash can 20. For example, in some embodiments, the back side enclosure 56 can be configured to receive and retain at least one battery. The back side enclosure 56 can have a generally low profile configuration. For example, the back side enclosure 56 can extend rearwardly from the rear wall 28 a distance of less than or equal to about 1 inch, or less than or equal to about ⅕ of the distance between the outside surfaces of the rear wall 28 and the front-most portion of the front wall 30.

Figure 6:
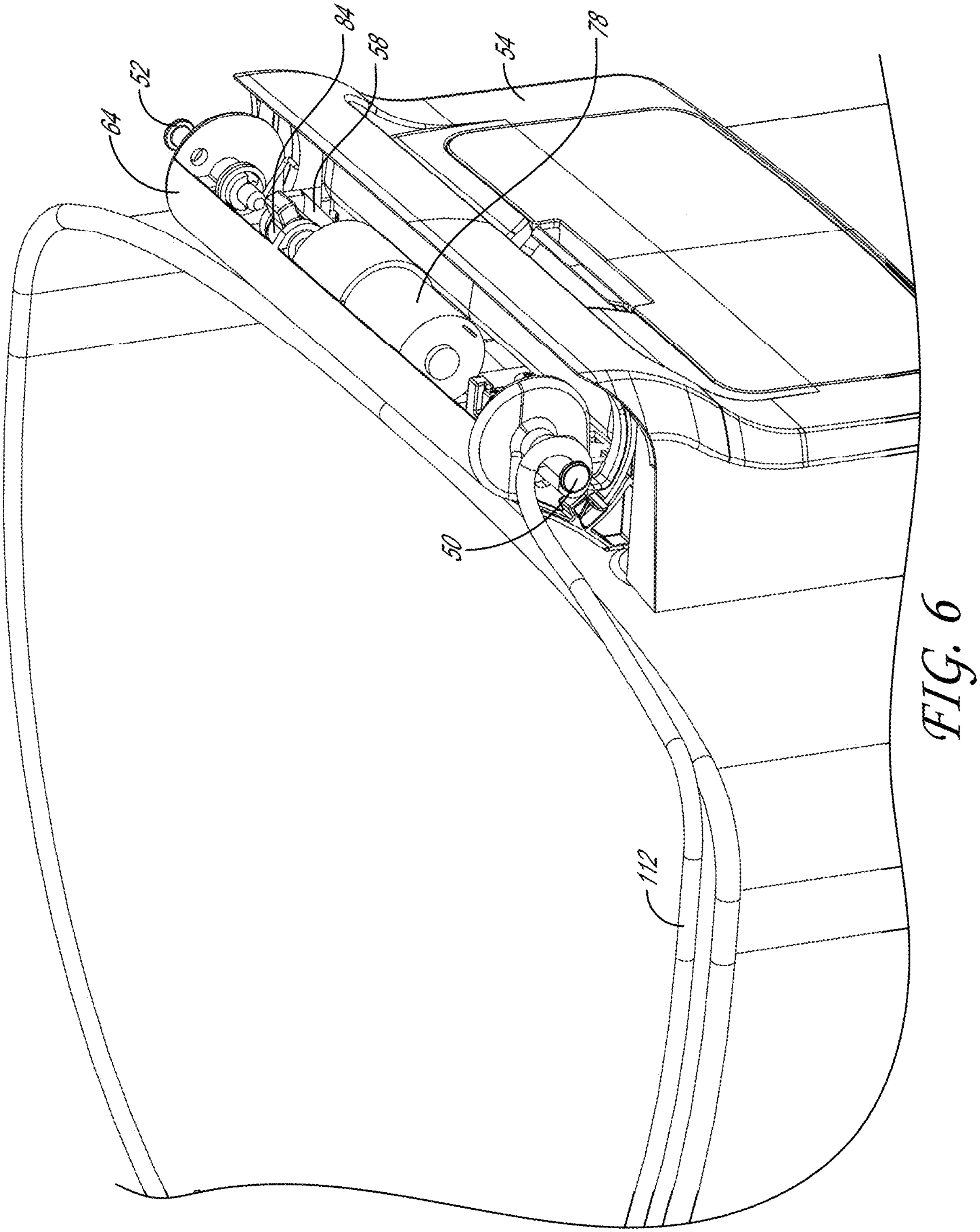
FIG. 6 is an enlarged top, rear, and left side perspective view of the receptacle illustrated in FIG. 1, with the lid and trim member removed to show a lifting mechanism.

With reference to FIG. 6, in some embodiments, a housing 64 for a power operated driving mechanism 58 can be positioned on or near the rear wall 28, such as above or on top of the back side enclosure 56. In the illustrated embodiment, the housing 64 is a generally cylindrical structure or shell. In other embodiments, the housing 64 can be of other various designs and shapes. In some embodiments, the shape and location of the housing 64, the compactness of the driving mechanism 58 within the housing 64, and/or the generally low-profile of the back side enclosure 56 can allow the trash can assembly 20 to be positioned flush or substantially flush with a wall (not shown) or other generally flat vertical structure of a building or home. Thus, the trash can assembly 20 can have a smaller footprint and/or take up less floor space. In some embodiments, the back side enclosure 56 and/or the driving mechanism housing 64 extend rearwardly from the rear wall 28 less than or equal to about 1.5 inches.

Certain embodiments of the trash can assembly 20 include a trim member 38. As illustrated in FIG. 4, in some embodiments, the trim member 38 is connected with the back side enclosure 56 and/or body components, such as by fasteners 29 (e.g., screws). Some embodiments of the trim member 38 are configured to rotate with respect to the body component 22 and/or the lid 24. The trim member 38 can be made of various materials, such as plastic or metal. The trim member 38 and the body component 22 can be made from the same or different materials. For example, the trim member 38 and the body component 22 can comprise a plastic material. Some embodiments of the trim member 38 can engage and/or overlap the upper edge 26 of the trash can assembly 20.

Figure 7:
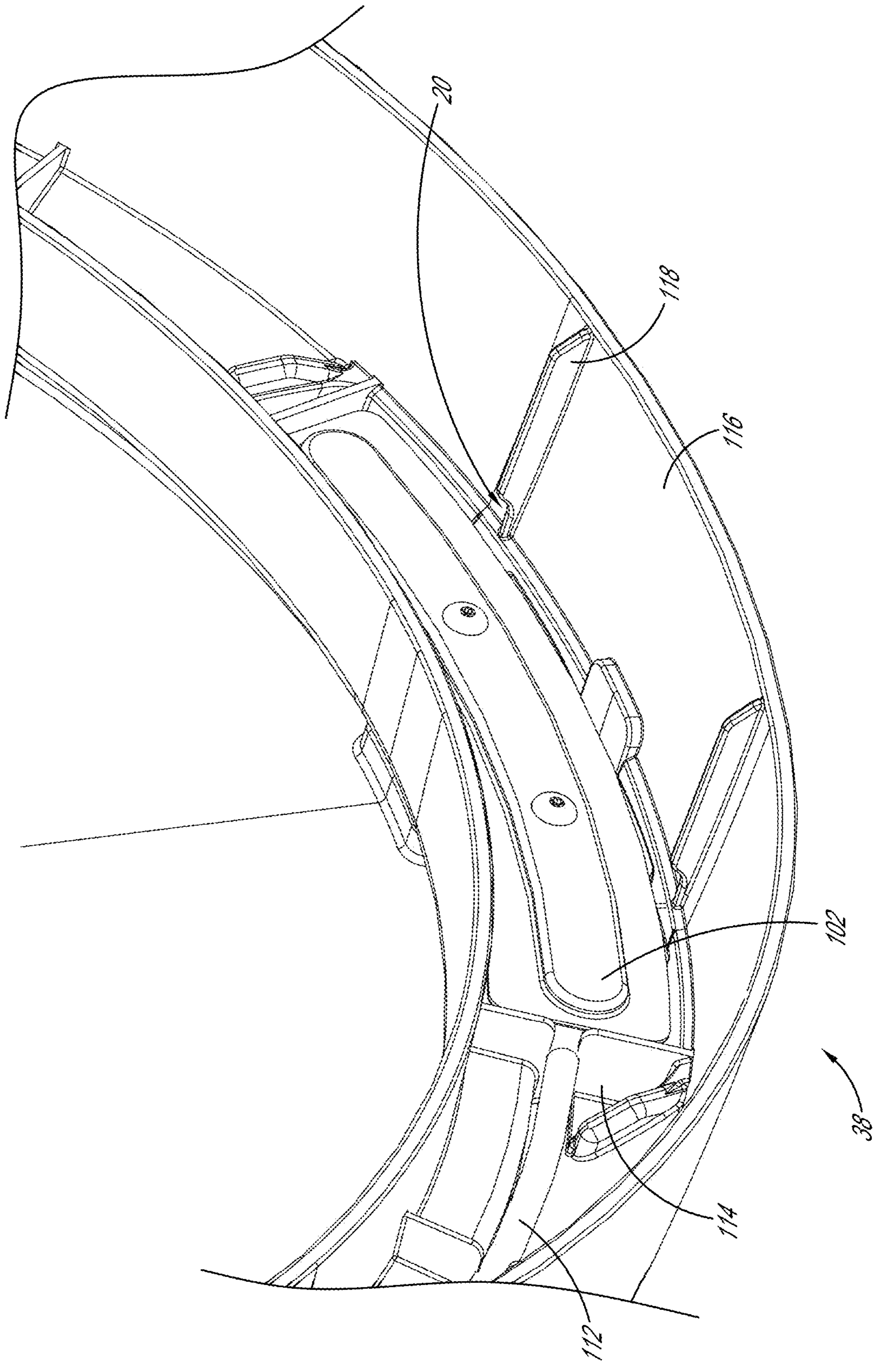
FIG. 7 is an enlarged bottom view of a portion of the trim member of FIG. 1.

As illustrated in FIG. 7, which shows a bottom portion of the trim member 38, certain embodiments of the trim member 38 are configured to support and/or mask electrical components, such as a sensor assembly 102 and/or wire 112 that connects the sensor assembly 102 to the power source 66 or a controller. One or several guide members 114 can be positioned underneath a top surface of the trim member 38 to generally inhibit movement of the wire 112 within the trim member 38, thereby generally hiding the wire from view and reducing the chance of rubbing or other damage to the wire 112.

Figure 8:
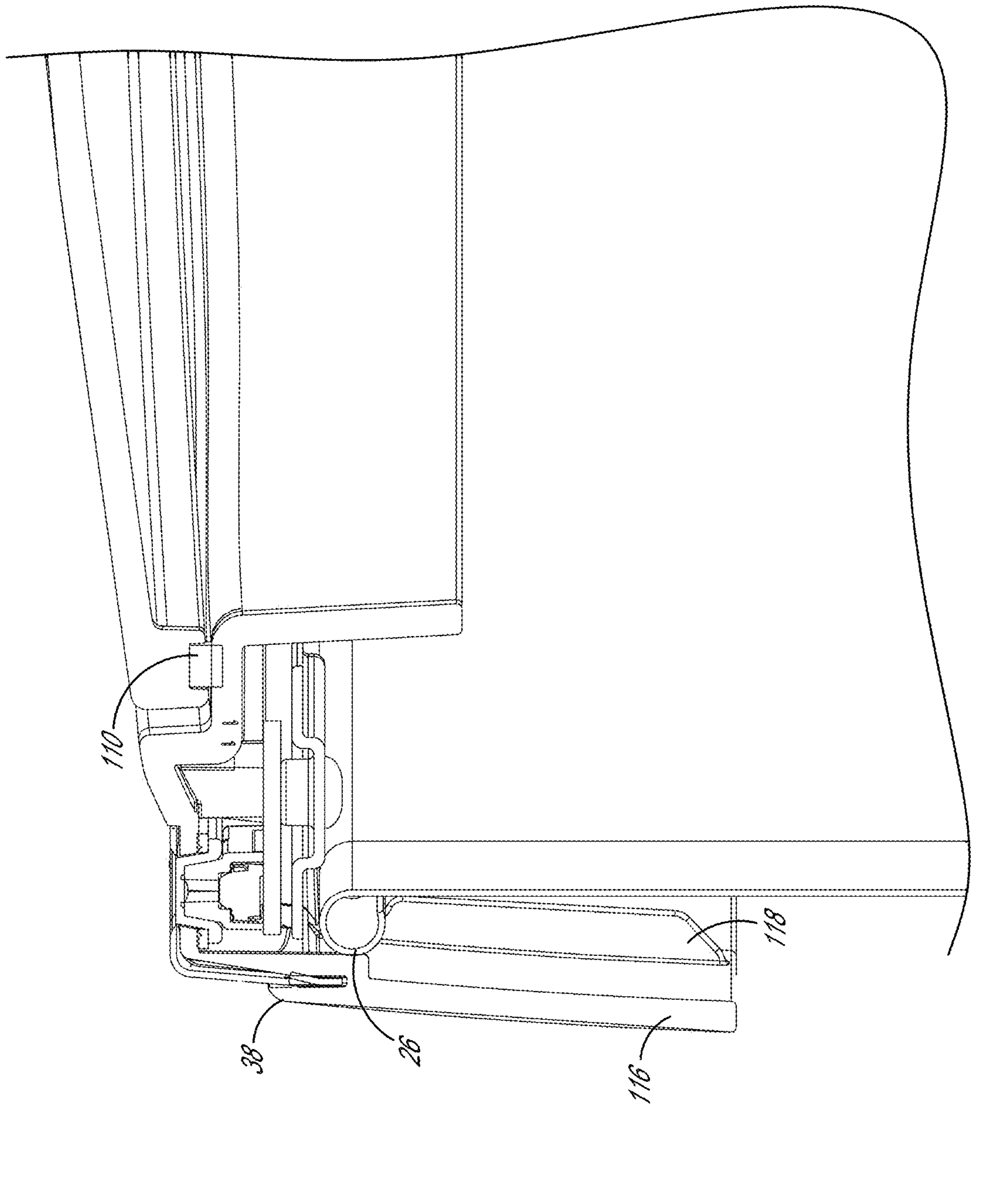
FIG. 8 is an enlarged partial cross sectional view of the receptacle of FIG. 1.

With reference to FIGS. 7-8, in some embodiments, the trim member 38 is configured to secure or retain an upper portion of the trash bag between the trim member 38 and the upper edge 26 of the body component 22. The trim member 38 can include a wall 116 that extends generally downwardly (e.g., in a generally transverse direction to the top surface of the trim member 38). In certain configurations of the trim member 38, the wall 116 extends downwardly beyond the upper edge 26 and along the body component 22. In some embodiments, bag retention features, such as radially inwardly extending flaps 118, are positioned on the inside of the wall 116. The flaps 118 can include an edge engagement element, such as a recess 119. In some embodiments, the recess 119 is positioned at one end of the flap 118 and/or near the top surface of the trim member 38. The flaps 118 can be configured to receive, nest with, and/or or removably lock onto the upper edge 26, such as by a friction fit. In some embodiments, when a trash bag is placed in the body component 22 and the upper portion of the trash bag is positioned over the rolled edge or annular lip of the upper edge 26, the trim member 38 can be positioned (e.g., rotated into position) such that the trash bag is disposed between the trim member 38 and the body component 22. Further, the flaps 118 can be configured to receive the rolled edge or annular lip of the upper edge 26, thereby generally securing a portion of the trash bag between the flaps 118 and the upper edge 26 and inhibiting the trash bag from falling into the body component 22.

Figure 9:
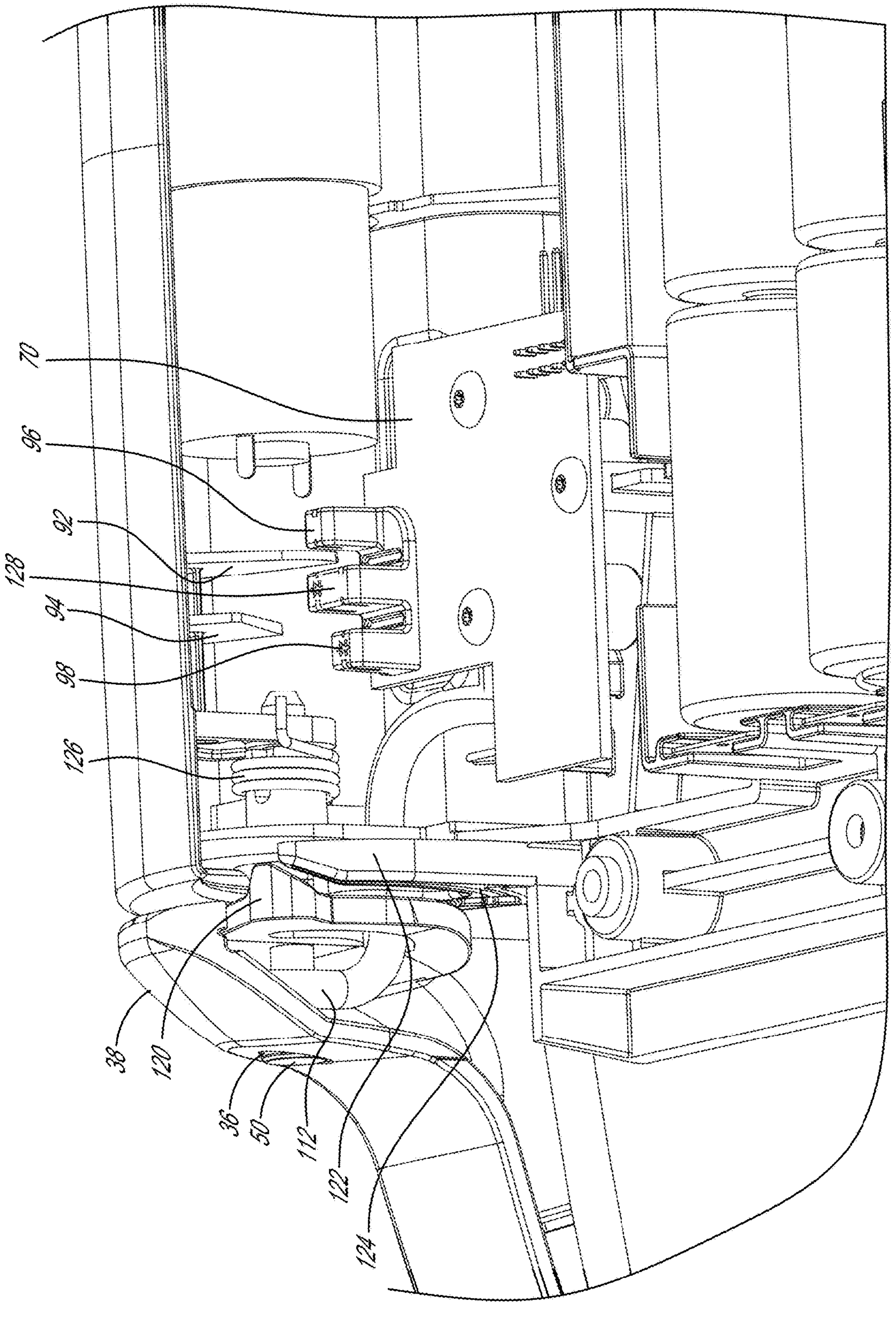
FIG. 9 is an enlarged partial rear perspective view of the receptacle illustrated in FIG. 1, with the back cover removed.
Figure 10:
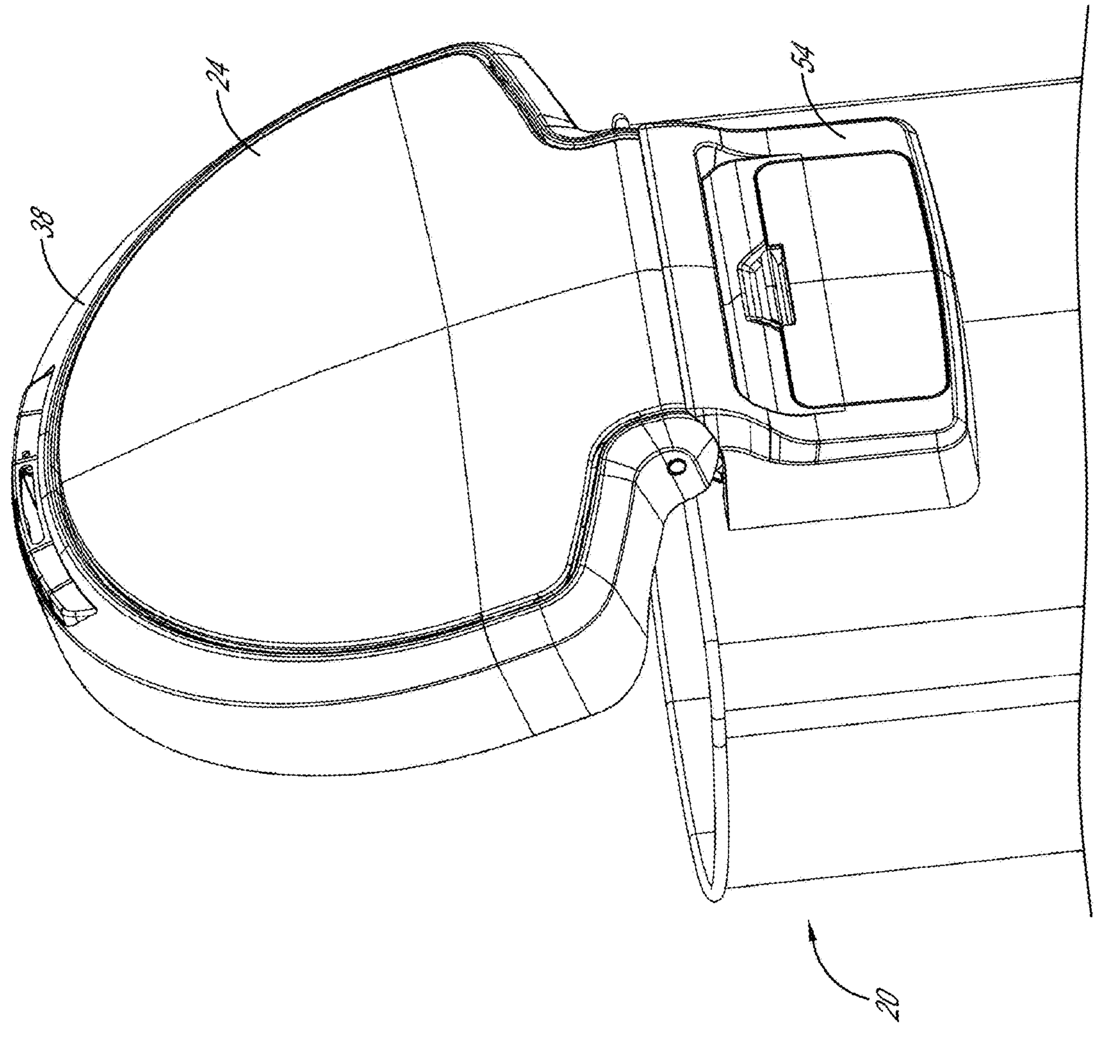
FIG. 10 is an enlarged top, rear, and left side perspective view of the receptacle illustrated in FIG. 1, with the lid and trim member in the open position.

In some embodiments as illustrated in FIGS. 9-10, the trim member 38 can be positioned and/or maintained in an open position (e.g., against the force of gravity and/or without requiring a person to hold or otherwise keep the trim member 38 in the open position). The open position can, for example, allow a user to mount a trash bag in the trash can assembly 20 and/or do extended chores, such as cleaning the inside of the trash can assembly 20. As illustrated, in some embodiments, the trim member 38 rotates with respect to the body component to reach the open position. In some embodiments, the trim member 38 includes a retaining mechanism. For example, as shown in FIG. 9, the trim member 38 can include a first cam structure 120, such as a tooth, which can be located at the rear of the trim member 38 and on an adjacent side of the housing 64. The first cam structure 120 can be configured to engage a second cam structure, such as a ramp 122. In some embodiments, the second cam structure includes a recess 124 that is configured to receive some or all of the first cam structure 120. The recess 124 can be located at or near an end of the ramp 122 and may be positioned near the rear of the trash can assembly 20. In some embodiments, as the trim member 38 rotates (e.g., toward the open position), the first cam structures 120 rotate (e.g., clockwise) into abutment with the ramp 122. The first cam structure 120 can engage (e.g., slide and/or ride up) the ramp 122 and into the recess 124, which can retain the first cam structure. Thus, the trim member 38 can remain in the open position while the user switches bags or completes one or more chores. When such tasks are complete, the trim member 38 can be rotated in the generally opposite direction (e.g., counter-clockwise) to a closed position, in which the flaps 118 can be engaged with the upper edge 26 of the body component, as discussed above.

The lid 24 and trim member 38 can be pivotally attached to the trash can assembly 20 by any manner. In the illustrated embodiments, the lid 24 and trim member 38 are pivotally coupled to the trash can assembly 20 generally along the same pivot axis. The pivotal connection can be any type of connection allowing for pivotal movement, such as, hinge elements, pins, or rods. For example, with reference to FIGS. 6 and 9, first pivot features, such as pins 50, 52, extend laterally through the housing 64 of the driving mechanism 28 that opens and closes the lid 24, and can be adapted to be received in corresponding second pivot features, such as through-holes 36, provided at the rear of the trim member 38. The pins 50, 52 can extend through the through-holes 36 to pivotably connect the trim member 38 to the housing 64 of the trash can assembly 20 along a pivot axis. With reference to FIG. 2, in some embodiments, a portion of or the entire lid 24 can be positioned, located, or received in a recess 68 in the interior of the trim member 38. In some embodiments, a damper 110 (e.g., foam, springs, rubber pads, or any other generally pliable, resilient, and/or damping structure) can be positioned between the lid 24 and trim member 38, such as to provide noise reduction when the lid 24 closes onto the trim 38.

In some embodiments, a rear portion of lid 24 can be pivotably coupled to the trash can assembly 20 along the same pivot axis as the trim member 38. For example, the rear portion of lid 24 can be pivotably coupled to the trash can assembly 20 along the same pivot axis as the trim member 38 via the pins 50, 52, which can also connect the trim member 38 to the driving mechanism housing 64 of the trash can assembly 20.

In some embodiments, the pins 50, 52 can extend through the trim member 38 and the housing 64 and are adapted to be received in corresponding through-holes 72 of additional structures secured to the inside of the rear of the lid 24 located adjacent to the driving mechanism components 74. In some embodiments, the pins 50, 52 can pivotably couple the lid 24 and trim member 38 to the trash can assembly 20 along the same pivot axis. In some embodiments, as illustrated in FIG. 5, bias members 126, such as one or more torsion springs, can be positioned on the pins 50, 52. The biasing members 126 can provide a biasing force to assist in opening and/or closing the lid 24, which can reduce the amount of power consumed by the motor 78 when moving the lid 24 between the open and closed positions and/or can allow for the use a smaller motor (e.g., in dimensional size and/or in power output).

Figure 11:
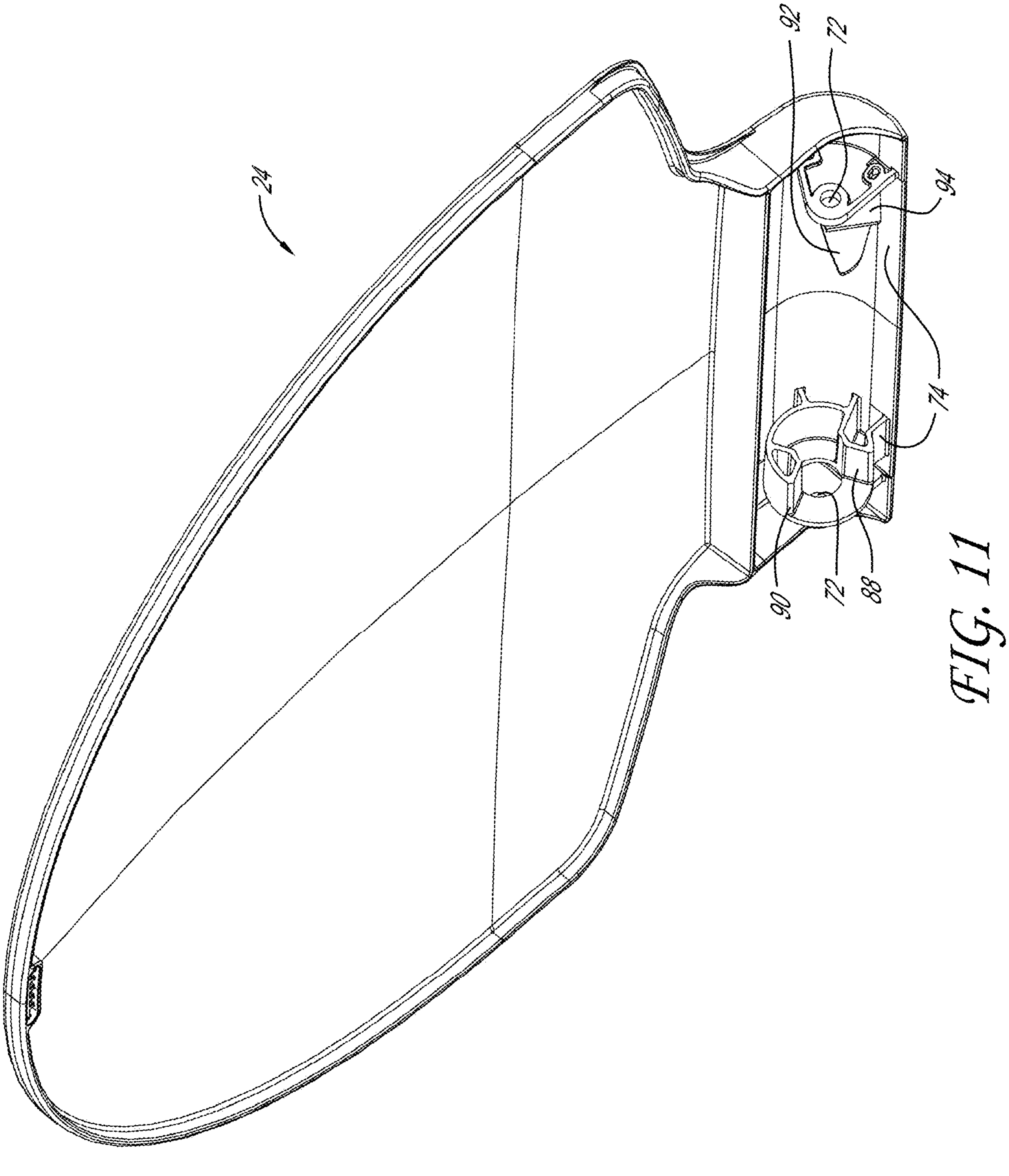
FIG. 11 is an enlarged front, bottom, and left side perspective view of the lid of FIG. 1.

With reference to FIG. 11, the lid can include lid driving mechanism components 74. In certain variants, the lid driving mechanism components 74 are configured to abut, mate, contact, receive and/or be received in the drive mechanism 58 in the housing 64 to facilitate opening and closing the lid 24. In some variants, the lid driving mechanism components 74 include a generally C-shaped portion. In certain implementations, the lid driving mechanism components 74 can include rotation support members, such as flanges 88, 90, and lid position sensing elements, such as flagging members 92, 94. As illustrated, the flanges 88, 90 and/or the flagging members 92, 94 can extend radially inwardly and can be attached at or near the rear underside of the lid 24. As described in further detail below, the controller 70 can communicate with a sensing system to determine various functions and parameters of the trash can assembly, such as when to drive the motor 78 so as to open or close the lid 24. As illustrated, in some embodiments, a portion of or the entire lid driving mechanism components 74 can be secured to the inside of the rear of the lid 24.

With reference to FIGS. 5-6 and 11-12, the driving mechanism 58 can include a controller or circuit board 70. In some embodiments, the driving mechanism components in the housing 64 can include a drive motor 78 and shaft or axle 80. Some embodiments include a bias member, such as a spring 82. Certain embodiments include a clutch mechanism 84 and/or a torque transmission member, such as an end member 86. At least some of the driving mechanism components can be removable from the other components. For example, the drive motor 78, or other component, can be removable such so as to facilitate repair, replacement, etc.

With reference to FIG. 9, the driving mechanism 58 can include a first position sensor 96 (e.g., a closed position sensor) and a second position sensor 98 (e.g., an open position sensor). The position sensors 96, 98 can comprise paired optical proximity detectors, such as light emitters, that cooperate with an intermediate sensor 128, such as a light receiver. However, other types of sensors can also be used. As illustrated, the position sensors 96, 98 can be located together in one housing, which can facilitate manufacturability and repair and can reduce the overall space occupied by the position sensors 96, 98. As described in more detail below, in some embodiments, the position sensors 96, 98 can be configured to facilitate detection of the position of the lid 24 as it moves between the open and closed positions. The motor 78 and the position sensors 96, 98 can be configured to communicate with the controller 70 so as to facilitate control of the movement of the lid 24.

In some embodiments, the lid 24 includes the flagging members 92, 94, which can be oriented or otherwise configured as to indicate, in cooperation with the position sensors 96, 98, a position of the lid 24. As shown in FIG. 9, when the lid 24 is in its home or fully closed position, the flagging member 92 is located between the position sensor 96 and the intermediate sensor 128 and the flagging member 94 is not located between the position sensor 98 and the intermediate sensor 128. In some configurations, the flagging member 92 being between the position sensor 96 and the receiver 128 blocks an emission (e.g., a signal) between the position sensor 96 to intermediate sensor 128. In some embodiments, such emission blocking can be interpreted (e.g., by the controller implementing an algorithm) to discern a position of the lid 24. For example, the controller 70 can be configured to determine that the lid 24 is in its home or closed position when flagging member 92 is located in position sensor 96 to block emissions to the intermediate sensor 128.

In some embodiments, as the lid 24 rotates into the fully open position, the flagging member 92 rotates such that it is no longer between the position sensor 96 and the intermediate sensor 128. However, in certain embodiments, as the lid 24 rotates into the fully open position, the flagging member 94 rotates such that it is between the position sensor 98 and the intermediate sensor 128, thereby blocking emissions (e.g., a signal) between the sensor 98 to intermediate sensor 128.

In some embodiments, when the flagging member 94 is located between the position sensor 98 and the intermediate sensor 128, and the flagging member 92 is not located between the position sensor 96 and the intermediate sensor 128, the controller 70 can be configured to determine that the lid 24 is in a fully open position. In certain embodiments, the controller 70 can be configured to determine that the lid 24 is in a fully open position when the opposite orientation occurs. In some embodiments, the intermediate sensor 128 is configured to receive emissions from one or both of the position sensors 96, 98. In some embodiments, the one or both of the position sensors 96, 98 are configured to receive emissions from the intermediate sensor 128.

Any combination of flagging members and position sensors can be used to detect various positions of the lid 24. For example, additional positions (e.g., an about half-way opened position) can be detected with additional sensors and flagging members in a manner similar or different than that described above. Some embodiments have flagging members located in the housing 64 and position sensors on the lid 24.

With reference to FIG. 2, the trash can assembly 20 can also include a sensor assembly 102 disposed on a generally outer portion of the trash can assembly 20. In the illustrated embodiment, the sensor assembly 102 is disposed near the front of the trim member 38, in an upper generally central portion. In some embodiments, the sensor assembly 102 can include an outer covering 104 which can include a transparent or translucent structure that permits transmission and/or receipt of light signals. For example, the outer covering 104 can be made of glass or plastics, such as Polycarbonate, Makrolon®, etc. In some embodiments, the outer covering 104 can be substantially flush with a top surface of the trim member 38. In some embodiments, the sensor assembly 102 can sense a user's movements to direct the lid 24 to open or close. For example, the sensor assembly 102 can sense a reflected or emitted signal or characteristic (e.g., light, thermal, conductivity, magnetism, or otherwise) from a user (e.g., a body part). In some embodiments, the sensor assembly 102 is configured as is described in U.S. Patent Application Publication No. 2011/0220647, filed Mar. 4, 2011, the entirety of which is hereby incorporated by reference.

In some embodiments, the lid 24 can be configured to permit manual operation of the lid 24 generally without damage (e.g., stripping or wearing down) to components of the trash can assembly 20, such as the motor 78, shaft 80, or otherwise. As previously noted, and as illustrated in FIG. 11, the lid 24 can include flanges 88, 90, which can be positioned on the rear underside of the lid 24. As illustrated, generally open circumferential spaces exists between the flanges 88, 90.

Figure 12:
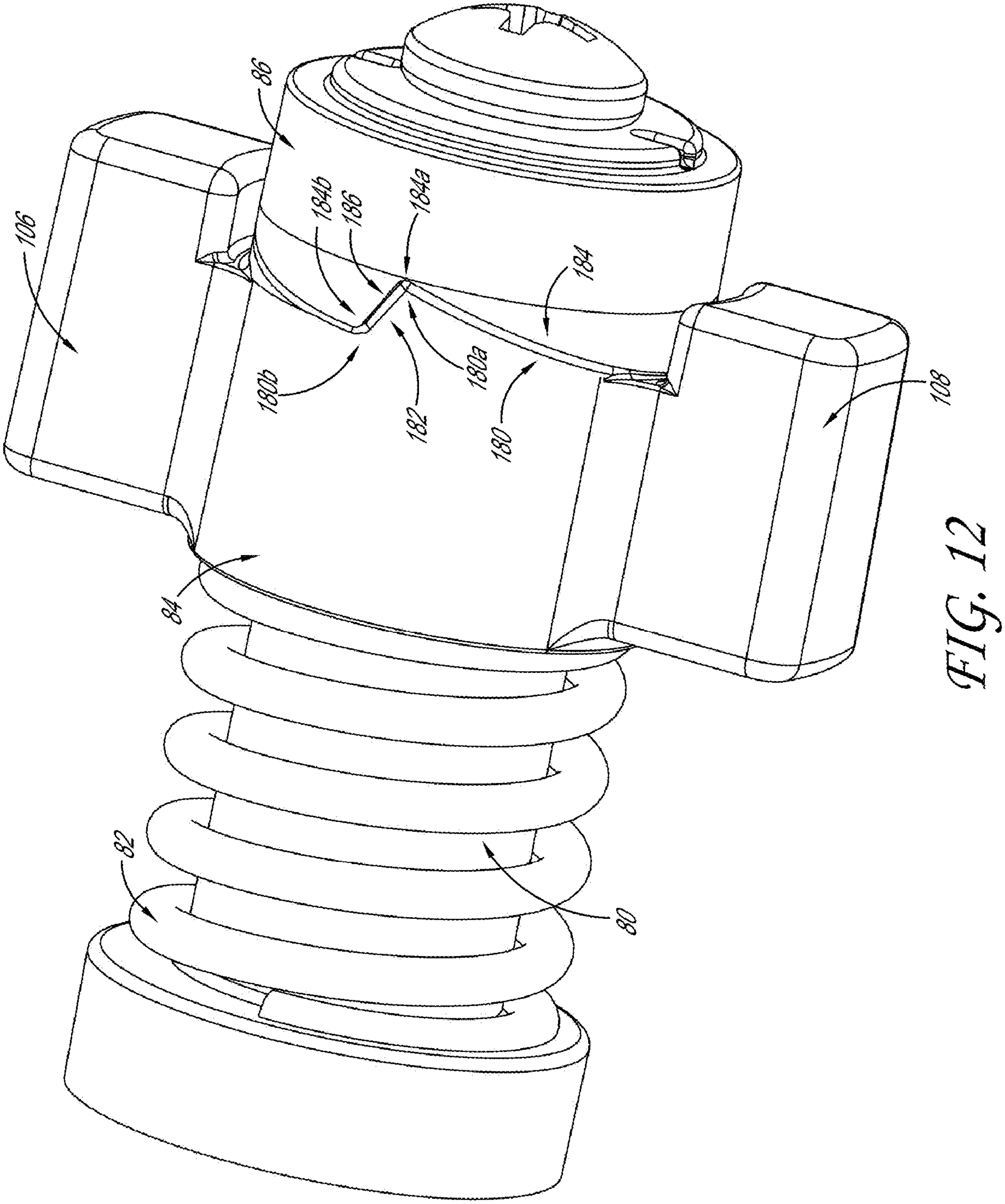
FIG. 12 is an enlarged perspective view of the motor and gear drive mechanism of the lifting mechanism illustrated in FIG. 6.

The flanges 88, 90 can be configured to engage a clutch mechanism 84, which can enable the lid 24 to rotate without, or without substantial, rotation of the motor 78, shaft 80, or certain other components of the trash can assembly 20, as discussed in more detail below. As illustrated in FIG. 12, the clutch mechanism 84 includes one or more torque transmission members, such as arms 106, 108, that can extend radially outward from a body of the clutch mechanism 84. In some embodiments, the arms 106, 108 are spaced apart from each other, such as by about 180 degrees. Various other angles are contemplated, such as at least: about 30°, about 45°, about 60°, about 90°, about 120°, values in between, or otherwise.

Figure 13:
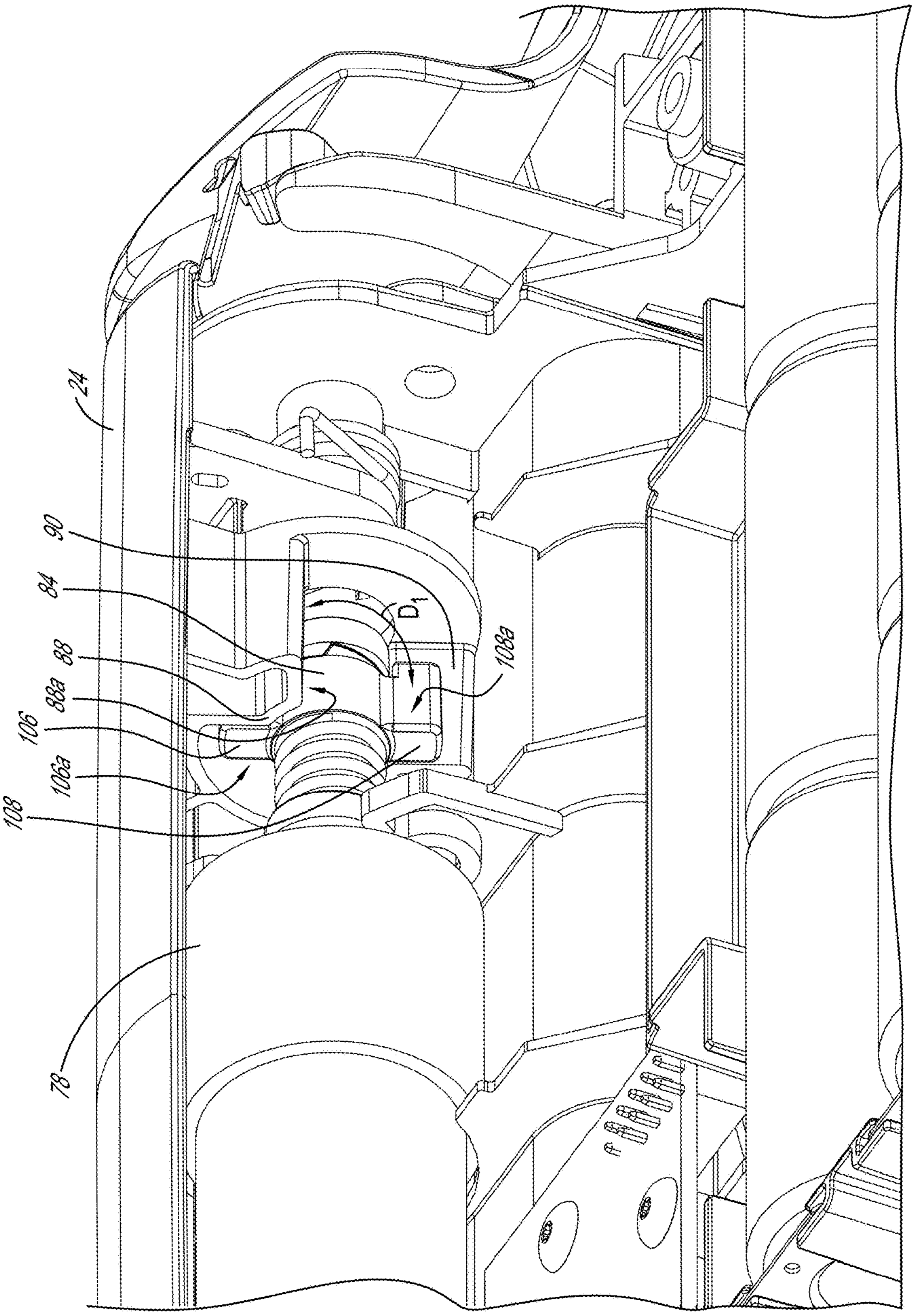
FIG. 13 is an enlarged partial rear perspective view of the receptacle illustrated in FIG. 1, with the back cover removed.

The arms can be positioned in the circumferential spaces between the flanges 88, 90. For example, the arms 106, 108 can abut or contact a surface the flanges 88, 90, as illustrated in FIG. 13. In certain such configurations, when the arm 106 is abutted with flange 90 and the arm 108 is abutted with flange 90, a circumferential distance D1 exists between a non-abutted surface 108*a* of the arm 108 and a non-abutted surface 88*a* of the flange 88. In some embodiments, a generally equal circumferential distance D2 (not shown) exists between a non-abutted surface 106*a* of the arm 106 and a non-abutted surface 90*a* (not shown) of the flange 90. In certain configurations, the circumferential distance D1 and/or D2 is greater than or equal to the amount of rotation of the lid from the open to the closed position. For example, the circumferential distance D1 and/or D2 can be at least about 60° and/or less than or equal to about 125°. In certain variants, the circumferential distance D1 and/or D2 is greater than or equal to about 80°. As discussed below, such a configuration can allow the lid 24 to be manually moved between the open and closed positions.

In some embodiments, the clutch mechanism 84 is positioned on the motor shaft 80 between a biasing member, such as a spring 82, and an end member 86. In some embodiments, the end member 86 is fixed to the motor shaft 80, thus torque from the motor 78 can be transmitted through the shaft 80 and into the end member 86. In some embodiments, the bias on the clutch mechanism 84 against the end member 86 can result in a frictional interface between the clutch 84 and end member 86. The frictional interface between the clutch 84 and end member 86 can result in the clutch 84 rotating when the shaft 80 rotates. For example, torque from the motor 78 can be transmitted through the shaft 80, through the end member 86, and into the clutch mechanism 84. In some variants, certain components (e.g., the spring 82, clutch mechanism 84, and end member 86) are positioned in general coaxial alignment along a portion of the longitudinal length of the shaft 80.

During operation of some embodiments, the motor 78 can turn the shaft 80, which can turn the end member 86, which can turn the clutch mechanism 84 (e.g., by the frictional interface between the end member 86 and clutch mechanism 84). Rotation of the clutch mechanism 84 can result in rotation of the arms 106, 108. Because, in some embodiments, the arms 106, 108 generally abut or contact the flanges 88, 90 of the lid 24, rotation of the arms 106, 108 can result in rotation of the flanges 88, 90, and thus the lid 24 (e.g., from the closed to the open position).

As illustrated in FIG. 13, due to the circumferential distances D1, D2 between the non-abutted surfaces 88*a*, 90*a* of the flanges 88, 90 and the non-abutted surfaces 106*a*, 108*a* of the arms 106, 108, the lid 24 can be manually opened without turning the motor 78. As an example, manual operation of the lid as illustrated in FIG. 13 will now be discussed. As illustrated in FIG. 13, the lid 24 is in the home or closed position. If a user, were to manually operate the lid 24 toward the open position (e.g., rotate the lid clockwise in the illustrated embodiment), the flange 88 would rotate generally clockwise in an arc path and the flange 90 would rotate about an equivalent distance in generally the same direction (e.g., clockwise). No force would be applied to the arms 106, 108 of the clutch mechanism 84, which, as discussed above, is connected with motor shaft 80 via the end member 86. Similarly, a user could then close the lid 24 and the flanges 88, 90 would rotate in generally the opposite direction (e.g., counter-clockwise) as when the lid was opened, back to their original positions when the lid 24 was in the home position, without applying any force to the arms 106, 108 of the clutch mechanism 84. Thus, in certain embodiments, no force is required to be applied to the arms 106, 108 to turn the clutch mechanism 84 and motor shaft 80.

As noted above, in some embodiments, the power operated driving mechanism 58 can be used to open or close the lid 24. For instance, the motor 78 can rotate the shaft 80, which can rotate the end member 86, which can transmit the torque to the clutch mechanism 84, which can rotate the flanges 88, 90 and the lid 24. In some embodiments, a coupling device can be positioned between the motor 78 and the shaft 80 to reduce vibrations from being transferred from the motor 78 to other mechanism being driven, such as the lid 24. In certain instances, after or during operation of the driving mechanism 58 (e.g., after or as the lid 24 is being moved between the open and closed positions), a user may accidentally or intentionally try to manually close or open the lid 24. In certain such situations, the flanges 88, 90 generally remain in contact with the arms 106, 108 rather than rotating relative to the arms 106, 108 as discussed above. In some embodiments, this is because the rotational force produced by the motor 78 (via the shaft 80, end member 86, and/or clutch mechanism 84) encourages rotation of the arms 106, 108 against the flanges 88, 90 (e.g., the arms 106, 108 apply a pushing force to the surfaces of the flanges 88, 90 to rotate the lid 24). Thus, in some embodiments, a user who manually closes the lid 24 when the motor has opened, or is in the process of opening the lid 24, acts against the operation of the motor 78.

For example, when the motor 78 of FIG. 13 is opening the lid 24, the motor 78 encourages the arms 106, 108 to abut against and turn the flanges 88, 90 to turn in a clockwise direction (viewed from the perspective of FIG. 13). Yet when a user manually attempts to close the lid 24, the lid and the flanges 88, 90 are encouraged in a counter-clockwise direction (viewed from the perspective of FIG. 13). Thus, in certain configurations, the arms 106, 108 are being encouraged to rotate in opposite directions concurrently. Such a scenario can result in damage to the arms 106, 108 of the clutch mechanism 84, the shaft 80, the motor 78, or otherwise. In some embodiments, to generally avoid such damage, the clutch mechanism 84 or other structure can be configured to rotate with respect to the end member 86 or other components.

In some embodiments, the clutch mechanism 84 includes a first cam surface 180 and a first return surface 182. As shown in FIG. 12, the first cam surface 180 can be inclined from a first level to a second level, in relation to a plane extending generally transverse to the longitudinal axis of the clutch mechanism 84. The first return surface 182 can intersect the first cam surface 180 and can be disposed between the first and second levels.

In some embodiments, the end member 86 includes a second cam surface 184 and a second return surface 186. The second cam surface 184 can be inclined from a first level to a second level, in relation to a plane extending generally transverse to the longitudinal axis of the end member 86 and the shaft 80. The second return surface 186 can intersect the first cam surface 180 and can be disposed between the first and second levels.

The second cam surface 184 and the second return surface 186 of the end member 86 can be shaped to correspond with the first cam surface 180 and the first return surface 182 of the clutch mechanism 84, thereby allowing mating engagement of the end member 86 and the clutch mechanism 184. For example, summits **180*a* of the first cam surface 180 can be nested in the valleys 184*b* of the second cam surface 184, and summits 184*a* of the second cam surface 184 can be nested in the valleys 180*b* of the first cam surface 180**.

As previously discussed, in some embodiments, torque from the motor 112 can be transmitted through the shaft 80 to the end member 86. In some embodiments, the end member 86 is generally rigidly connected with the shaft 80, such as by a fastener (e.g., a screw). Thus, in certain variants, the end member 86 is inhibited or prevented from rotating relative to the shaft 80. In certain implementations, the end member 86 is configured to transmit torque from the motor 112 to the clutch mechanism 84, such as by friction between the first and second cam surfaces 180, 184 and/or between the first and second return surfaces 182, 186.

In some embodiments, the clutch mechanism 84 can translate along a portion of the longitudinal length of the shaft 80. As shown, the biasing member 82 can bias the clutch mechanism 84 into engagement with the end member 86. In some embodiments, translation of the clutch mechanism 84 (e.g., in a direction generally toward the motor 112) along a portion of the drive shaft 80 is generally against the bias of the biasing member 82.

In some embodiments, when the lid 24 is manually operated, the clutch mechanism 84 and the end member 86 rotate relative to each other. For example, in some embodiments, when the lid 24 is manually operated the first and second inclined cam surfaces 180, 184 move relative to each other. In certain configurations, the inclined cam surfaces 180, 184 slide relative to each other, which results in the inclined cam surfaces climbing each other. For example, as the inclined cam surfaces 180, 184 slide relative to each other, the summits **180*a*, 184*a* of the inclined cam surfaces 180, 184** circumferentially approach each other.

In certain embodiments, the relative movement between the first and second inclined cam surfaces 180, 184 (e.g., by the interaction of the inclines) urges the clutch mechanism 84 and the end member 86 apart. For example, the clutch mechanism 84 and the end member 86 can be urged in generally opposite directions along the longitudinal axis of the shaft 80. In some embodiments, the end member 86 is generally restrained from moving longitudinally (e.g., by the fastener). However, certain embodiments of the clutch mechanism 84 are able to move away from end member 86 by translating along the shaft 80 (e.g., against the bias of the biasing member 82). Thus, in certain implementations, relative rotation of the inclined cam surfaces 180, 184 results in the clutch mechanism 84 translating along a portion of the longitudinal length of the shaft 80 (e.g., in a direction generally toward from the motor 78), against the bias of the biasing member 82. Certain embodiments can facilitate relative rotation of the clutch mechanism 84 and the end member 86 without imposing undue stress on, or damage to, the clutch mechanism 84, end member 86, shaft 80, and/or motor 78. Accordingly, manual operation of the lid 24 can be performed without imposing undue stress on, or damage to, components of the trash can assembly 20.

In some implementations, when manual operation of the lid 24 ceases, the bias of the biasing member 82 can return the clutch mechanism 84 into generally full engagement with the end member 86. For example, after manual operation of the lid 24 ceases, the bias of the biasing member 82 can facilitate re-engagement of the inclined cam surfaces 180, 184. In some embodiments, re-engaging the clutch mechanism 84 and the end member 86 allows the transmission of torque from the motor 78 to the clutch mechanism 84, which can provide powered operation of the lid. Thus, some embodiments provide automatic and/or passive engagement and/or disengagement of the motor 78 and/or drive shaft 80 from the clutch mechanism 84 and/or the lid 24.

Although the trash cans have been disclosed in the context of certain embodiments and examples, it will be understood by those skilled in the art that the present disclosure extends beyond the specifically disclosed embodiments to other alternative embodiments and/or uses of the trash cans and obvious modifications and equivalents thereof. In addition, while several variations of the trash cans have been shown and described in detail, other modifications, which are within the scope of the present disclosure, will be readily apparent to those of skill in the art. For example, a gear assembly and/or alternate torque transmission components can be included. For instance, in some embodiments, the trash can assembly 20 includes a gear assembly. Some embodiment of the gear assembly include a gear reduction (e.g., greater than or equal to about 1:5, 1:10, 1:50, values in between, or any other gear reduction that would provide the desired characteristics), which can modify the rotational speed applied to the shaft 80, clutch mechanism 84, and/or other components.

It is also contemplated that various combinations or sub-combinations of the specific features and aspects of the embodiments can be made and still fall within the scope of the present disclosure. It should be understood that various features and aspects of the disclosed embodiments can be combined with or substituted for one another in order to form varying modes of the trashcans. Thus, it is intended that the scope of the present disclosure should not be limited by the particular disclosed embodiments described above.

The following is claimed:

1. A trash can assembly comprising:

a body comprising a front wall, a rear wall, a lower base, an upper opening, and an upper lip;

a lid that is rotatable between a closed position and an open position;

a trim that is rotatable between a lower resting position and an upper retained position, the trim movable relative to the lid, the trim being visible to a user of the trash can assembly when the lid is in the closed position and the trim is in the lower resting position;

the trim, in the lower resting position, comprising a flat exterior front surface positioned horizontally outward from the upper lip of the body such that the flat exterior front surface is positioned farther frontward than any other portion of the trim, the flat exterior front surface extending downward beyond the upper lip and upward beyond the upper lip; and a retainer configured to maintain the trim in the upper retained position against the force of gravity;

wherein, when the trim is in the lower resting position and the lid is in the closed position, no part of the lid is positioned directly above the highest point on the trim.

2. The trash can assembly of claim 1, wherein the flat exterior front surface is generally parallel with a longitudinal axis of the trash can assembly.

3. The trash can assembly of claim 1, wherein the trim further comprises a portion on an interior side of the trim behind the exterior front surface, the portion extending horizontally inwardly and configured to contact the upper lip when the trim is in the lower resting position.

4. The trash can assembly of claim 1, wherein the trim is rotatable about an axis of rotation that is rearward of the rear wall of the body.

5. A trash can assembly comprising:

a body comprising a front wall, a rear wall, a lower base, an upper opening, and an upper lip;

a lid that is rotatable between a closed position and an open position;

a trim that is rotatable between a lower resting position and an upper retained position, the trim movable relative to the lid, the trim being visible to a user of the trash can assembly when the lid is in the closed position and the trim is in the lower resting position;

the trim comprising an exterior surface that is positioned horizontally outward from the upper lip of the body, the exterior surface having a top-most edge that is above the upper lip and a bottom edge that is below the upper lip, the exterior surface being flat between the top-most and bottom edges, the top-most edge being positioned horizontally in front of the lid when the lid is in the closed position; and a retainer configured to maintain the trim in the upper retained position against the force of gravity.

6. The trash can assembly of claim 5, wherein the top-most edge is graspable by a user of the trash can assembly when the lid is in the closed position.

7. The trash can assembly of claim 5, wherein the bottom edge of the exterior surface is a bottom-most edge of the trim.

8. The trash can assembly of claim 5, wherein, when the trim is in the lower resting position and the lid is in the closed position, no part of the lid is positioned directly above the highest point on the trim.

9. The trash can assembly of claim 5, wherein the trash can assembly does not include a rigid liner for a trash bag.

10. A trash can assembly comprising:

a body comprising a lower base, an upper opening, and an upper lip;

a lid that is rotatable between a closed position and an open position;

a trim that is rotatable between a lower resting position and an upper retained position, the trim movable relative to the lid;

the trim comprising an exterior surface that is positioned horizontally outward from the upper lip of the body, the exterior surface having a top-most edge that is above the upper lip and a bottom-most edge that is below the upper lip, the top-most and bottom-most edges being graspable by a user of the trash can assembly when the lid is in the closed position;

a foot pedal that is configured to move the lid, relative to the trim, between the closed and open positions; and a retainer configured to maintain the trim in the upper retained position against the force of gravity.

11. The trash can assembly of claim 10, wherein the exterior surface is flat between the top-most and bottom-most edges.

12. The trash can assembly of claim 10, further comprising a back side enclosure, the back side enclosure and the trim forming an assembly that is connected to a rear wall of the body with fasteners.

13. The trash can assembly of claim 12, wherein the retainer comprises:

a cam on one of the trim and a lateral side of the back side enclosure; and a recess on the other of the trim and the lateral side of the back side enclosure, the recess configured to receive the cam to maintain the trim in the upper retained position against the force of gravity.

* * * * *